(12) United States Patent
Wu et al.

(10) Patent No.: US 11,435,857 B1
(45) Date of Patent: Sep. 6, 2022

(54) CONTENT ACCESS AND NAVIGATION USING A HEAD-MOUNTED DEVICE

(71) Applicant: GOOGLE LLC, Mountain View, CA (US)

(72) Inventors: Qinge Wu, Fremont, CA (US); Seth Raphael, Portland, OR (US); Alexander Gregory Chu, Berkeley, CA (US); David Yu Chen, Sunnyvale, CA (US); Mike Ma, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/302,283

(22) Filed: Apr. 29, 2021

(51) Int. Cl.
*G06F 3/042* (2006.01)
*G06F 3/16* (2006.01)
*G06F 3/01* (2006.01)
*G06F 3/0487* (2013.01)
*H04N 5/232* (2006.01)
*G06F 3/0482* (2013.01)

(52) U.S. Cl.
CPC ............ *G06F 3/0425* (2013.01); *G06F 3/012* (2013.01); *G06F 3/0482* (2013.01); *G06F 3/0487* (2013.01); *G06F 3/167* (2013.01); *H04N 5/23218* (2018.08)

(58) Field of Classification Search
CPC .......... G06F 3/011; G06F 1/163; G06F 3/017; G06F 3/013; G06F 3/04842; G06V 20/20; G06V 10/235; G06V 40/28; G02B 2027/0178; G02B 2027/0138; G02B 27/017; G02B 2027/0187; G02B 27/0172; G02B 2027/014; G09B 21/006; G09B 21/008; G06T 19/006; A61F 9/08

USPC ......... 345/8, 156, 158, 633; 348/62, 207.01; 382/103, 107, 114

See application file for complete search history.

(56) References Cited

U.S. PATENT DOCUMENTS

| | | | | |
|---|---|---|---|---|
| 2004/0210444 | A1* | 10/2004 | Arenburg | G06F 40/263 704/277 |
| 2012/0212593 | A1* | 8/2012 | Na'Aman | G06V 20/20 348/E7.085 |
| 2013/0169536 | A1* | 7/2013 | Wexler | G06F 3/011 345/158 |
| 2013/0215147 | A1* | 8/2013 | Hilkes | G09B 21/008 345/633 |

(Continued)

OTHER PUBLICATIONS

Lewis, "Using ORCAM Myeye 2 on a Trip to the Mobile World Congress", ORCAM User Guide | MyEye 2.0, Aug. 12, 2018, 58 pages.

*Primary Examiner* — Koosha Sharifi-Tafreshi
(74) *Attorney, Agent, or Firm* — Brake Hughes Bellermann LLP

(57) ABSTRACT

In a general aspect, a head-mounted device (HMD) can be configured to receive a selection of a mode of operation of a content reader of the HMD from a plurality of modes of operation, and initiate, in response to the selection, a content capture process to capture content within a field of view (FOV) of a camera of the HMD. The HMD can be further configured to identify, in the captured content, a plurality of content items, receive a navigation command to select a content item from the plurality of content items, and provide, in response to the navigation command, readback of the selected content item.

20 Claims, 17 Drawing Sheets

(56) References Cited

U.S. PATENT DOCUMENTS

| | | | |
|---|---|---|---|
| 2014/0253701 A1* | 9/2014 | Wexler | G06F 3/011 |
| | | | 348/62 |
| 2014/0361988 A1* | 12/2014 | Katz | G02B 27/0172 |
| | | | 345/156 |
| 2015/0002808 A1* | 1/2015 | Rizzo, III | A61H 3/061 |
| | | | 351/158 |
| 2015/0042562 A1 | 2/2015 | Kurzweil et al. | |
| 2017/0064363 A1* | 3/2017 | Wexler | H04N 5/247 |
| 2017/0186230 A1* | 6/2017 | Ivers | G06F 3/04842 |

* cited by examiner

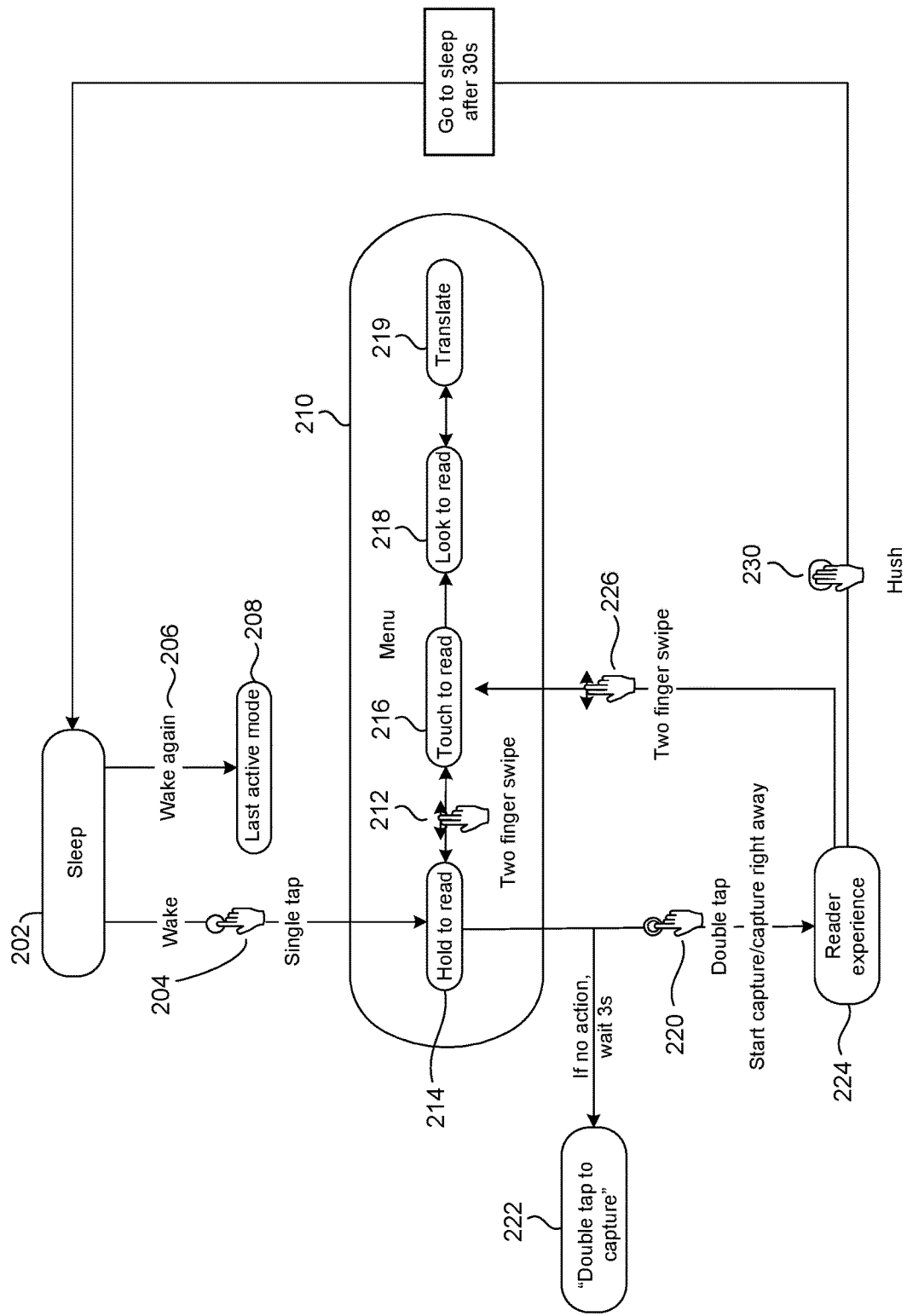

| 9-1 | Energy Statement  PG&E www.pge.com/1/yEnergy | 9-2 | Count No: 1023456789-0  Statement Date: mm/dd/yyyy  Due Date: mm/dd/yyyy |

| 9-3 | Service For:  Residential CARE customer  1234 Main Street  Anytown, CA000000 |

| 9-4 | Account summary |
| Account due on previous statement | $334.72 |
| Payment(s) received since last statement | 0.00 |
| Previous unpaid balance | $334.72 | 9-4' |
| Current electric charges | $197.74 |
| Electric adjustments | -39.42 |
| Current Gas charges | 69.89 |

| 9-5 | Question about your bill?  Monday-Friday 7am-9pm  Saturday 8am-6pm  Phone: 000000000  www.sdfdsfsdfsd.com |

Local office address
111 STONY CIR
SANTA ROCA CA 95401

Your enrolled programs
CARE discount, CA climate credit

| 9-6 | Total amount due by | $562.93 |

| 9-7 | Current charges include discounts of $169.58 for CARE and CA climate |

| 9-8 | Billing history — Daily usage compulsion  
*(Billing history — Unable to read data table)*  
■ Electric ▫ Gas — Gas Trams/day  
www.Page.com/My energy |

| 9-9 | Important messages  
California is fighting climate change and so can you! Your bill includes a Climate credit from a state program.......  
The gas summer Tier 1(baseline: season begins can April 1, your total tier 1 quantities shown........ |

99901234567890000005555000055555

| Account number:  1023456789-0 | Total amount Due:  No payment due |

JOHN DOE
12345 Main Street
Anywhere, CA000

PG&E
BOX 997300
SARAMENTO, CA 96899-7300

Page1 of 5

FIG. 9A

CONTENT ACCESS AND NAVIGATION USING A HEAD-MOUNTED DEVICE

TECHNICAL FIELD

This description relates to content access using a computing device, such as a head-mounted device.

BACKGROUND

Many techniques exist for recognizing and otherwise accessing content, such as printed or displayed text. For example, optical character recognition (OCR) enables conversion of an image of text (e.g., from a photograph or scanned document) into editable text. As another example, text-to-speech (TTS) enables generation of audible, spoken versions of text.

SUMMARY

In a general aspect, a head-mounted device (HMD) can be configured to receive a selection of a mode of operation of a content reader of the HMD from a plurality of modes of operation, and initiate, in response to the selection, a content capture process to capture content within a field of view (FOV) of a camera of the HMD. The HMD can be further configured to identify, in the captured content, a plurality of content items, receive a navigation command to select a content item from the plurality of content items, and provide, in response to the navigation command, readback of the selected content item.

The details of one or more implementations are set forth in the accompanying drawings and the description below. Other features will be apparent from the description and drawings, and from the claims.

BRIEF DESCRIPTION OF THE DRAWINGS

FIG. 2A illustrates a process flow according to example implementations.

FIG. 9A is a diagram illustrating paragraphing of content according to example implementations.

DETAILED DESCRIPTION

Figure 1:
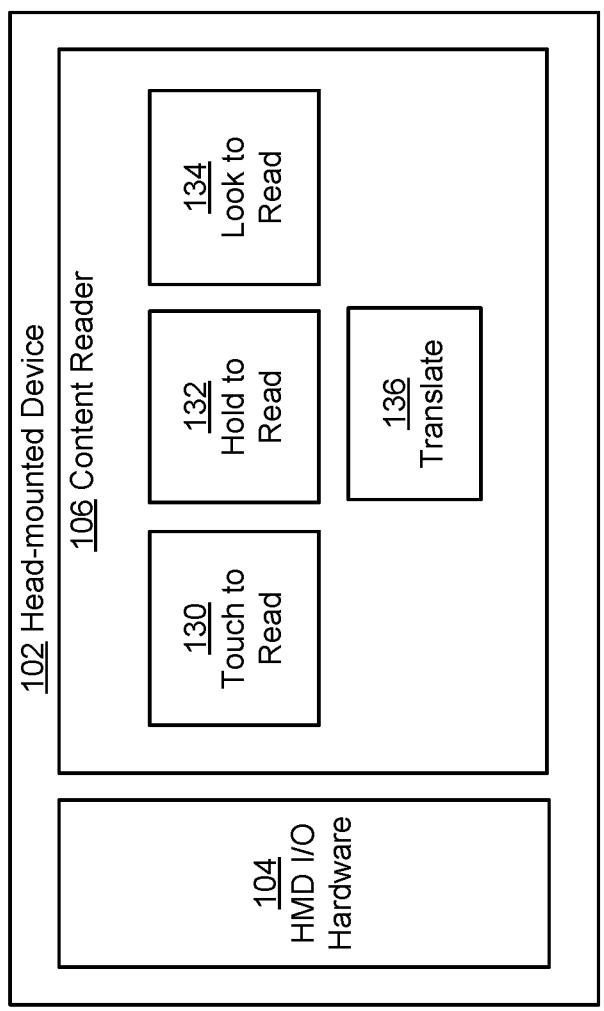
FIG. 1 is a block diagram of a head-mounted device (HMD) that can be used for context access and navigation.

Described systems and techniques enable real-time interaction between a user and visible content, such as written text, using a head-mounted device (HMD) worn by the user. During example operations, an image of content is captured using the HMD. In some implementations, while the user views the content using the HMD, head movement tracking with respect to the content can be performed. In some implementations, head movement tracking can be performed in conjunction with pointer tracking, such as in touch-to-read implementations, as described herein. In such implementations, the pointer may include a finger of the user or other pointing device. In such implementations, as the user continues to view the content using the HMD, the user is able to identify, e.g., point to, a specific content item and trigger the HMD to capture and provide the content to the user, such as using an output device of the HMD, or otherwise use or access or use the content, such as to identify a consumer product.

In some implementations, capture of content can be performed (triggered) in response to a user input on an associated HMD, holding an object including the content in a field-of-view (FOV) of a camera of the HMD, such as an outward facing camera (e.g., for a threshold period of time); pointing at a portion of the content (e.g., pointing at a specific content item for a threshold period of time); and/or by looking content (e.g., for a threshold period of time).

For example, in some implementation, to identify a content item, such as a word, number, paragraph, heading, menu sections, product name on a packaged good, etc., the user may point their finger at the content item. Even if the user's finger partially or completely covers or occludes the content item, the described system is capable of providing an audible reading or other output or use of the content item. As another example, user can access content by holding or looking at the content and then navigate between content items using an input device, such as providing input gestures using a touchpad of an HMD, or using spoken commands, such as "next", "skip", "back", got to . . . ", and so forth. In such examples, individual contents items of content included on particular object (e.g., a document, a page, pages of a book, a letter, a consumer product, a sign, etc.) can be identified and ordered using various techniques, such as machine learning approaches. Such content item identification and ordering can be referred to as paragraphing. In some implementations, paragraphing can be based on one or more factors, such as arrangement of content items, information included in content items, variation in text sizes, presence of images or graphics, presence of bulleted lists within a document, presence of tables, etc. In some implementations, paragraphing can include assigning respective and ordered hypertext markup language (HTML) tags to individually identified content items withing content captured by a content reader.

Any user who prefers or requires assistance in interacting with content viewable with the HMD may benefit from described techniques. For example, as described below, users may wish to have translations of written content provided, or may wish to have functionalities of a device explained or executed. In particular examples, users with autism, dyslexia (or other reading challenges), or blind or low vision (BLV) users, may use described techniques to interact with written content, physical objects, consumer packaged products, or interactive devices, in manners that are not currently available.

For example, some currently-available, conventional techniques may provide a reading of text that is identified by a pointing action of a user. However, such techniques typically provide a simple read-out of text in a vicinity of a finger or other pointing implement, following a pointing action, or simply read text starting at top-left to bottom-right. If the user wishes to have a further read-out performed, then the user must repeat the entire process (e.g. pointing or starting at the beginning) for a new section of text, which may be overlapping with (e.g., repetitive of, or redundant to) previously-read text. As a result, such processes are imprecise, time-consuming, and generally cumbersome to the user.

In other words, in such systems, neither the system nor the user has knowledge of the content prior to, or independently of, the pointing action, and/or in sufficient detail to enable the types of interactions described herein. Instead, it is the pointing action that is used to identify the content for which knowledge is desired, and knowledge of the actual content is obtained in response to the pointing action.

Even if prior knowledge of particular content is available prior to the pointing action and associated outputs, conventional systems must rely on pre-existing sources of such prior knowledge. For example, such systems may rely on images of content that have been previously captured and annotated. Consequently, such systems are limited to use with such content, may suffer from high latencies, and are not capable of the types of real-time interactions described herein.

HMDs provide many benefits, such as enabling image capture within a natural FOV of a user, which can be consistent with, or represented by a FOV of a camera, or cameras included in the HMD. However, operations of HMDs may be constrained by available power (e.g., battery) levels, as well as processing limitations that may lead to unacceptable latencies in providing desired results. Such constraints may make some HMD operations infeasible or impractical. For example, in conventional uses, operations such as optical character recognition (OCR) may either consume excessive battery power, and/or may be associated with excessive latency.

Described techniques enable, in some implementations, such as touch-to-read implementations, practical use of HMDs to capture an image of content, perform OCR on the content to obtain recognized content, perform head-tracking with respect to the content, perform pointer-tracking with respect to the content, and relate the tracked pointer to the tracked and recognized content. Consequently, while the overlapping tracking operations of head tracking and pointer tracking are continuously and concurrently performed with respect to the content in such implementations, a user may have multiple, ongoing interactions with the content, in a manner that is low latency and low power. Described techniques also enable, in hold-to-read or look-to-read implementations, for example, practical use of HMDs to capture an image of content, perform OCR on the content to obtain recognized content, perform paragraphing of the content, and navigate between individual content items of the content. Such navigation can be done in response to user input, such as touchpad gestures and/or spoken navigation instructions. That is, a navigation command can be an input signal or stimulus that provides an indication, e.g., to a contact reader, to move between content items of the content. In some implementations, content of interest can be accessed by the user after it is captured, and is no longer withing a FOV of a camera of an associated HMD. For example, described techniques may require minimal (e.g., only once per interaction) occurrence of image capture and OCR of the associated content.

FIG. 1 is a block diagram of a head-mounted device (HMD) 102 that can be used for context access and navigation. As shown in FIG. 1, the HMD 102 can include HMD I/O hardware (hardware) 104 that can be used to implement a content reader 106, where the content reader can provide a user with access to content that might otherwise be unavailable to them, such as for BLV users, or users with other accessibility needs. In this example, the content reader 106 can include a plurality of operating modes, such as a touch-to-read mode 130, a hold-to-read mode 132, a look-to-read mode 134, and a translate mode 136.

The HMD 102 may include hardware (including the illustrated hardware 104, and any associated software) that may be worn on a head of a user and that leverages or utilizes its position on the user's head, and/or that relies on or augments user abilities (e.g., sight, hearing, or head position/orientation) to provide functionality to the user. In some implementations, functionality of the HMD 102 may alternatively or additionally be provided using other, different types of wearable devices, such as watches, rings, or clothing. The content reader 106 of FIG. 1 can include other elements, such as the elements of a content reader 306 shown in FIG. 3, which can be an implementation of the HMD 102. For purposes of brevity and clarity, such elements are not shown or described with respect to FIG. 1.

In some implementations, the HMD 102 (or the HMD 302 of FIG. 3) may include or represent glasses, augmented reality glasses, goggles, a hat, helmet, headband, or other headwear, including conventional headwear retrofitted with suitable hardware/software. Example implementations in which the HMD 102 is implemented using glasses is illustrated and described in more detail, below, with respect to FIG. 13. The hardware 104 of the HMD 102 may include or represent, e.g., multiple types of, e.g., image capture (e.g. one or more cameras and LED lighting); audio, such as speakers; inertial measurement units (IMUs), for positional tracking; light detection and ranging (LiDAR); and/or or haptic I/O elements, such as touch pads, as well as various types of wireless or network connection transceivers.

As noted above, the content reader 106 can implement a plurality of operating modes. e.g., touch-to-read mode 130, hold-to-read mode 132 and look-to-read mode 134. As shown in FIG. 1 and noted above, the content reader 106 can also include (implement) the translate mode 136, which can be implemented as part of, or in conjunction with each of the other operating modes, e.g., to readback content in a selected language regardless of the language of the original content, such as using text-to-speech (TTS) approaches on content (text) that have been processed using high-resolution OCR via an audio output of the illustrated hardware 104. While specific example implementations and use cases are described below with respect to each of these operating modes, in some implementations, operations of one operating mode can be implemented in another operating mode. For instance, content framing, described in further detail below could be performed as part of one or more of the operating modes of the content reader 106. As another example, paragraphing, also described in further detail below, could, in some implementation, be implemented in conjunction with any of the operating modes described herein. Also, while specific example implementations of each of the operating modes 130, 132, 134 and 136 of the content reader 106 are described in further detail below, those operating modes are briefly described here with respect to FIG. 1 and operation of the content reader 106.

In example implementations, when operating in the touch-to-read mode 130 using the approaches described herein, the content reader 106 can provide for a user to use their finger (or other pointing implement) to precisely indicate text (content) that they would like read back to them, or to indicate an object, such as a consumer product, that they would like to be identified, e.g., a snack, a soft drink, etc. In some implementations, the touch-to-read mode 130 can be implemented to be object-agnostic, such that any readable text (readable by the HMD 102) within reach of the user can be captured and read back to the user in response to the user pointing to that text. For example, the touch-to-read mode 130 could be used to provide (read back text) that is included on kitchen or other household appliances, gym equipment, specific sections in documents, packaged consumer products (e.g., which also be identified using available machine learning classification techniques), etc. In some implementations, the touch-to-read mode 130 can be used to identify a particular product that a user points to, such as to select a specific soft drink from a refrigerator. An example of using the touch-to-read mode 130 to operate a microwave is described below with respect to, at least, FIGS. 5A and 5B. It will be appreciated, however, that such techniques can be used in other applications, such as those noted above.

In example implementations, when operating in the hold-to-read mode 132 using the approaches described herein, the content reader 106 can read back text from physical documents that are held or placed (e.g. framed) within a FOV of the HMD 102. That is, the content reader can provide items from the content to a user via an audio output, or other output device, such as using TTS techniques, for example. This can allow users with visual impairments, or other reading difficulties to efficiently performs tasks that may, otherwise, be time consuming, frustrating, or not possible. For example, using the hold-to-read mode 132 of the HMD 102, a user can sort physical mail, sort billing statements, fill out paper forms, review restaurant menus, review product packaging, identify currency denominations, etc. Using the approaches described herein, the HMD 102 can provide the user auditory cues (instructions) to properly frame an object containing content of interest in a FOV of a camera of the HMD 102. The content can then be capture, OCRed, and paragraphed, as described herein. In some implementations, a user can navigate (using spoken commands, touchpad gestures, etc.) between individual content items of captured and paragraphed content. Using the approaches described herein, once the HMD 102 captures content of interest, a user can move the content (e.g., a document or other object) outside a FOV of the HMD 102 while the user accesses, navigates, etc. the captured content.

In some implementations, the hold-to-read mode 132 of the HMD 102 can also be used to identify packaged consumer products, such as grocery products, or other consumer goods, such as electronics, home improvements items, etc. For instance, a user could indicate that they wish to identify consumer goods by using a voice command, e.g., "Ok, what's this?", by navigating a menu of the content reader 106 to select a product identification function (e.g., such as shown in the example of FIG. 2A), and/or by simply holding a consumer product within a FOV of the HMD 102 (which can automatically trigger a product identification function of the hold-to-read mode 132 after a threshold period of time passes, such as 1.5 seconds). The content reader 106 can then use appropriate classification approaches, such as machine learning classification techniques, to identify the consumer product. This process can then be repeated for subsequent consumer products held by the user and framed within the FOV of the HMD. For each product, the content reader 106, e.g., via the illustrated hardware 104 of the HMD 102, can provide the user product information, such as summary including brand, item, and size; nutrition information, etc. This process can be repeated until the product identification is deactivated, either by a user input, or after a timeout period expires where no further products are placed within the FOV of the HMD.

In example implementations, the look-to-read mode 134 of the content reader 106 can allow a user to access content (readback and/or navigate text content) around them that may not be within their physical reach, and/or is included on object that they cannot practically hold, such as menus located on walls, aisle signs in grocery stores, directional sign, marquees, etc. then by giving them a continuous readback of any text they are directly looking at. In some implementations, the look-to-read mode 134 can be used in a continuous on-mode, such as in situations noted above, where it is impractical or cumbersome to hold or touch objects as a content capture approach, and/or when an amount of text to be read back is not dense or voluminous, such that described navigation features of the content reader 106 may be preferred.

As noted above, the translate mode 136 of the content reader 106 can be implemented in conjunction with each of the touch-to-read mode 130, the hold-to-read mode 132 and/or the look-to-read mode 134. For instance, the translate mode 136 can allow allows users of the HMD 102 to have physical text translated from one language to another, e.g., when the physical text is in a different language than a default or selected translate, or readback language. This feature can augment the other operational modes of the content reader 106 as an optional form of content output. In some implementations, the translate mode 136 can operate in a variety of ways. For instance, the translate mode 136 can operate such that text from one language (e.g., that is OCR supported by the HMD 102) can be translated into a default readback language. That is, text that is not in the default readback language is translated to the default readback language when provided to the user. The translate mode 136 can also operate such that text from one language (e.g., that is OCR supported by the HMD 102) can be translated into a readback language that is selectable by a user. That is, text that is not in the selected readback language is translated to the selected readback language when provided (e.g., read back) to the user. The translate mode 136 can also operate on demand, or in response to an instruction from the user, such as a spoken instruction. For instance, a user could instruct the content reader 106 reader to provide a translation of captured content by speaking a command such as "Ok, translate this to German."

FIG. 2A illustrates a process flow according to example implementations. The process flow of FIG. 2A illustrates example operations for selecting modes of operation of a content reader, such as the content reader content reader 106 of FIG. 1. Accordingly, for purposes of illustration, FIG. 2A will be described with reference to the HMD 102 and the associated content reader 106 of FIG. 1. While specific gestures and commands are shown in FIG. 2A, it will be appreciated that other types of commands, such as spoken commands, or other gestures can be used to implement the illustrated process flow.

As shown in FIG. 2, the HMD 102 may initially be in a sleep mode (202), which may be a low power standby mode.

The HMD 102 may receive a command to wake (e.g., exit the sleep mode) into a normal operating mode, e.g., as a content reader. As shown in FIG. 2A, a single tap command (204) can be used to wake the HMD 102. As noted above, in some implementations, a spoken command, or other indication can be provided to cause the HMD 102 to exit the sleep mode. As also shown in FIG. 2A, if the HMD 102 has been previously brought out of a sleep mode and a mode of operation (implemented with or without a translate function) was selected for the content reader 106, a wake again command (206) can result in the HMD 102 exiting the sleep mode (202) and operating in its last active content reader mode (208).

If the HMD 102 does not have a last active mode, a desired mode of operation can be selected from a menu 210. For instance, a two finger swipe gesture (212) can be used to navigate the menu 210 to select between a hold-to-read mode (214), a touch-to-read mode (216) or a look-to-read mode (218). The menu 210 can also be navigated to set up a translate function (219) for the content reader 106. An example process flow for setting up the translate function (219) is described in further detail below with respect to FIG. 11. Example processes flow for operation in the touch-to-read mode, the hold-to-read mode, and the look-to-read mode are respectively illustrated and described in more detail below with to FIGS. 6 (touch), 8 (hold) and 10 (look).

Figure 6:
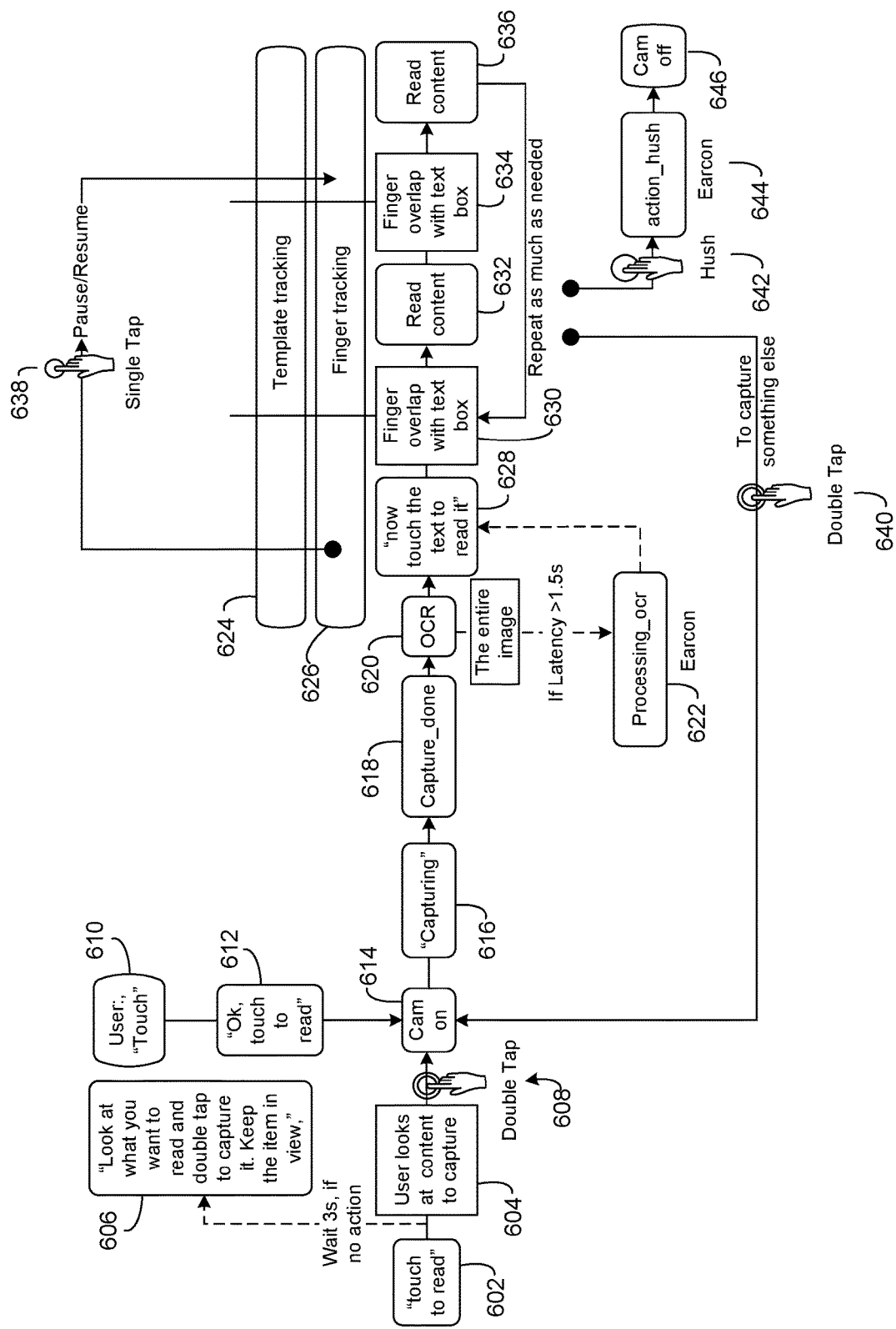
FIG. 6 illustrates another process flow according to example implementations.
Figure 8:
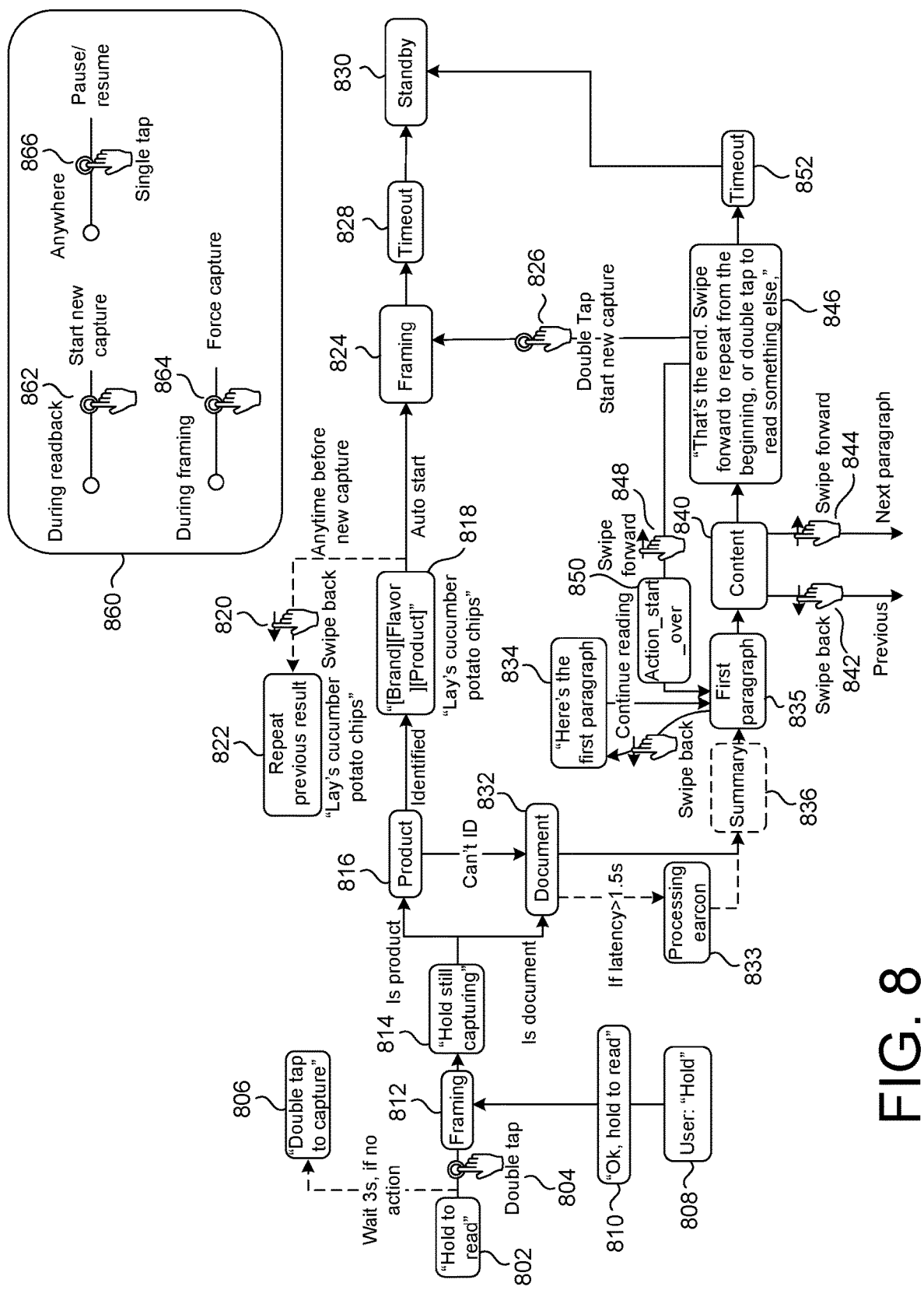
FIG. 8 illustrates another process flow according to example implementations.
Figure 10:
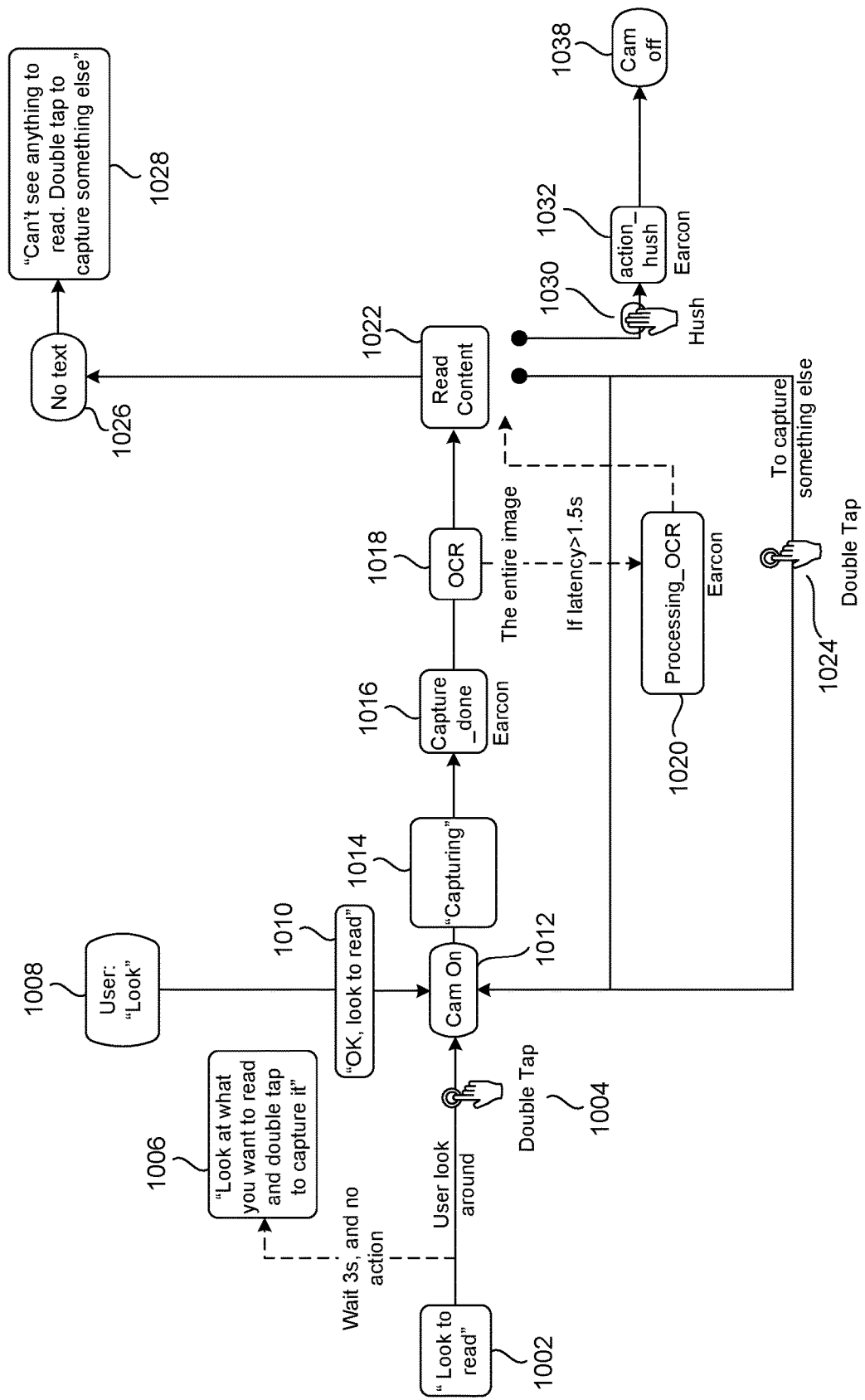
FIGS. 10-12 illustrate process flows according to example implementations.

After navigating the menu 210 to select a desired operation mode and/or translation function, a user can perform a double tap command (220) to active the selected mode of operation and/or translation and to begin a process of capturing content, such as illustrated in the example implementations of FIGS. 6, 8 and 10. If a threshold period of time passes, e.g., 3 seconds, an audio command of "Double tap to capture" (222) may be issued to prompt the user to activate the selected mode of content reader operation, and to begin capturing content. In response to the double tap command (220), the content reader 106 of the HMD 102 can capture content, and provide the user access to the captured content using the selected reader experience (224).

As shown in FIG. 2A, during the reader experience (224), a two finger swipe gesture (226), or other command, can be issued to return the content reader 106 to navigation of the menu 210, e.g., to select a different content reader operation mode and/or to initiate or change the translation function (219). Also during the reader experience (224), a hush command (230) can be issued by the user to pause or stop the reader experience (224). In some implementations, a hush command can be issued by a user holding their hand (open palm) in front of the HMD 102. If the user does not interact with the HMD 102 to negate the hush command, e.g., by issuing another gesture or spoken command, the HMD 102 can return to the sleep mode (202) after a threshold period of time, e.g., 30 seconds, which can help conserve available battery power.

Figure 2B:
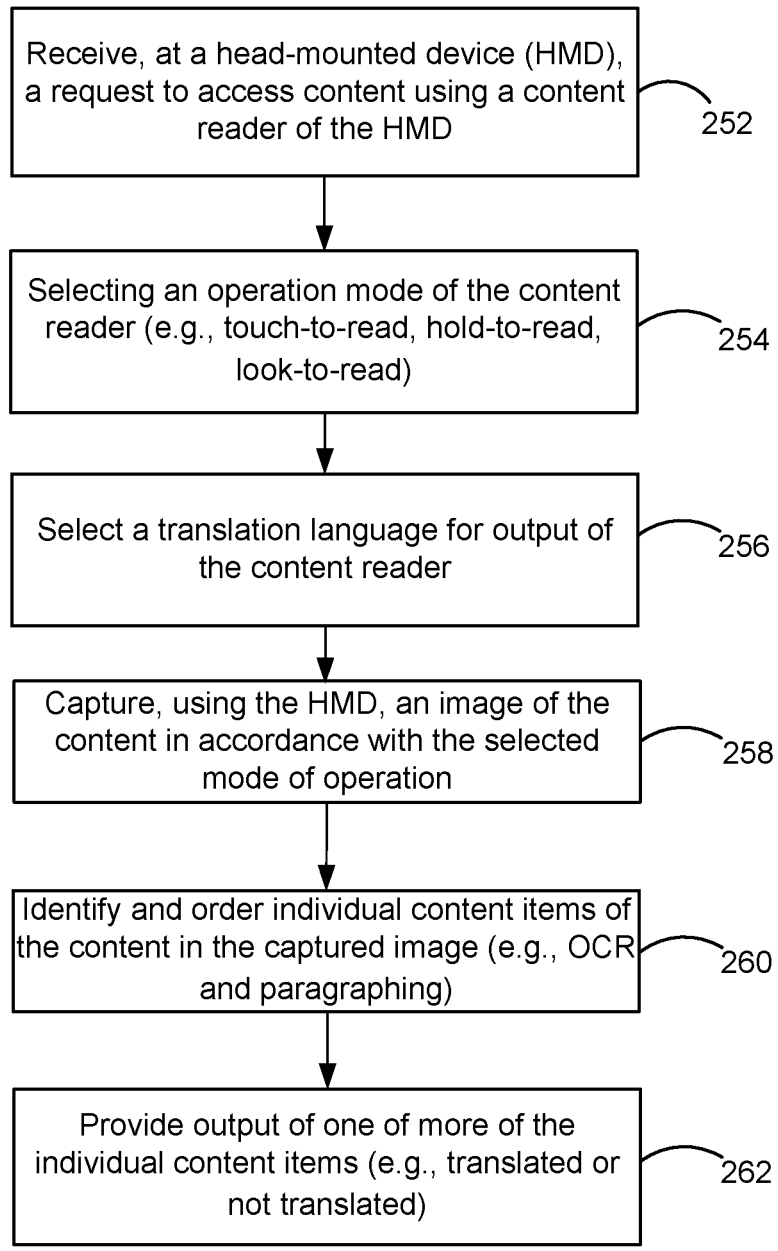
FIG. 2B is a flowchart illustrating example operations of the HMD of FIG. 1.

FIG. 2B is a flowchart illustrating example operations of the HMD of FIG. 1 for providing a content reader and access experience using the content reader 106. In some implementations, the example operations of FIG. 2B can be implemented using the example process flow illustrated in FIG. 2A, as well as the HMD 102 of FIG. 1. Accordingly, for purposes of illustration, FIG. 2B be will be described with further reference to FIGS. 1 and 2A. In the example of FIG. 2B, operations 252-262 are illustrated as separate, sequential operations. However, in various example implementations, the operations 252-262 may be implemented in an overlapping or parallel manner, and/or in a nested, iterative, looped, and/or branched fashion, as appropriate for a particular implementation. Further, various operations or sub-operations may be included, omitted, or substituted.

In FIG. 2B, at a HMD, a request to access content using a content reader of the HMD can be received (252). For example, in FIG. 2A, a user of the HMD 102 may issue a wake command request (204). In response to the wake command (204), an operating mode of the content reader can be selected (256), such as by navigating the menu 210, as was discussed with respect to FIG. 2A. For instance, hold-to-read mode (214), a touch-to-read mode (216), or a look-to-read mode (218) can be selected. Further, a translation language (if desired) can be selected (256), such that any content captured by the content reader that is not in the selected translation language may be translated to that language (e.g., if the language of the captured content is supported by OCR functions of the associated HMD). In some implementations, translation can be done on-demand, e.g., in response to a spoken, or otherwise specific command from a user.

An image of content of interest can then be captured (258) by a camera of the HMD (e.g., using an LED illumination device when appropriate), where the content is captured in accordance with the operation mode selected at block 254. In some implementations, capturing the image of the content can include framing the content, e.g., by providing instructions to the user to move the content, move their body position relative to the content, or move their head position relative to the content (e.g., using the head tracking and/or coordinate mapping approaches described herein). Examples of approaches for framing are further illustrated and described below with respect to, at least, FIG. 12. In response to capturing an image of content, individual content items of that content can be identified and ordered (260). Such identification and ordering can include performing an OCR process on the content, and applying machine learning classification techniques to obtain an understanding of the content (e.g., is it a utility bill, an unopened letter, a restaurant menu, an aisle sign in a store, a package consumer product, a $5 bill, etc.). One or more the identified content items can then be provided to, or accessed by a user (262). For instance, one of more content items can be read back to the user, such as using text-to-speech (TTS) approaches on content items (text) that have been processed using high-resolution OCR via an audio output of the illustrated hardware 104, the individual content items can be navigated between, e.g., using gestures and/or spoken commands, the content items can be read back to the user in the ordered determined by a paragraphing process (260), a command to navigate to specific content can be issued (e.g., a command "What are appetizers?" can be issued to have the appropriate content from a restaurant menu read back), and so forth.

Figure 3:
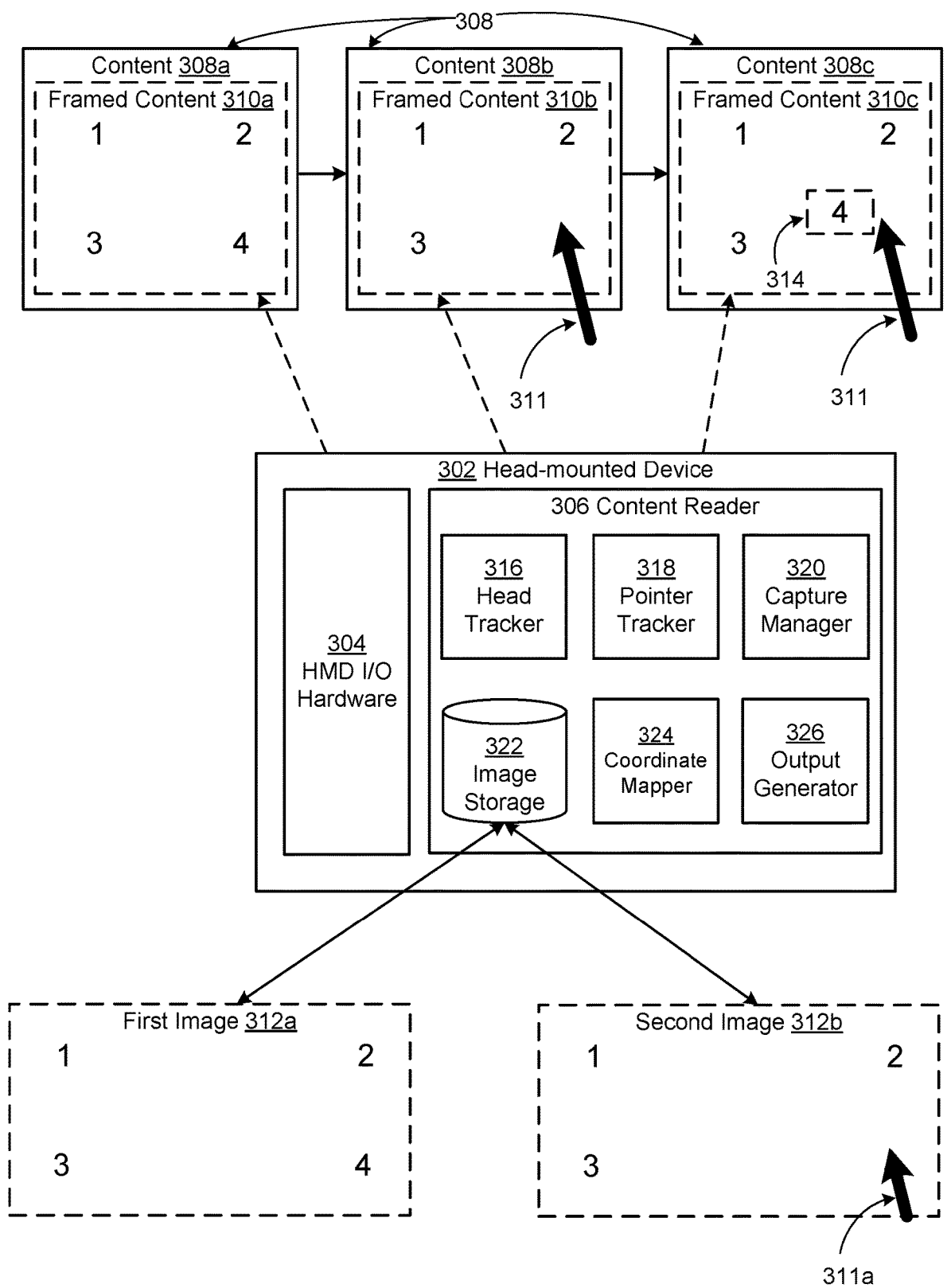
FIG. 3 is a block diagram of a system for content recognition and navigation using an HMD.

FIG. 3 is a block diagram of a system for pointer-based content recognition using a HMD 302. In this example, the HMD 302 can be an implementation of the HMD 102 operating in the touch-to-read mode 130. In FIG. 3, as described in detail below, the HMD 302 utilizes various types of input/output (I/O) hardware 304 to implement a content reader 306. The content reader 306 may be configured to provide a user of the HMD 302 with access to content 308 in a fast, responsive, intuitive, and accurate manner.

The content reader 306 may be configured to provide desired access to, and use of, content 308. In FIG. 3, the content 308 is illustrated at a first point in time as content 308a, at a second point in time as content 308b, and at a third point in time as content 308c. More generally, it will be appreciated that the content 308 may be viewed by the user, using the HMD 302, over a period of time, so that the content 308a, 308b, 308c represent what a user sees over that period of time. As a result, as described below, a corresponding sequential plurality of images of the content 308 may be captured by the HMD 302, while the user views the content 308 using the HMD 302.

In the simplified example of FIG. 3, the content 308 includes individual content items as the numbers 1, 2, 3, 4. For example, as shown in FIG. 3A, the content 308 may include, or may be provided on, an interactive touchpad, such as a touchpad for controlling an appliance, such as a microwave oven. In other examples, the content 308 may represent a computer keyboard. In other examples, the content 308 may be provided as printed text, such as a paper document, or a consumer product label. More generally, the content 308 may represent virtually any content that may be detected or recognized by the HMD 302. In addition to alphanumeric symbols, the content 308 may thus include, by way of non-limiting example, images, illustrations, or graphs.

Consequently, it will be appreciated that any such content may include various types of corresponding content items. For example, in addition to individual numbers and letters, content items may include words, image elements of an image, cells of a spreadsheet, or graph elements of graphs, etc. The content reader 306 may be configured to recognize, categorize, or classify specific types of content items and/or assign an order to those items, using any number of suitable techniques. For example, various types of machine learning may be used to identify desired types of content items from corresponding types of content.

Further in FIG. 3, a pointer 311 represents any suitable pointing device or implement that may be used to indicate at least one specific content item of the content 308. In many of the examples provided herein, the pointer 311 may represent a finger of a user. In other implementations, any suitable pointer may be used, such as a pen or pencil, or a stylus.

Thus, in the examples of FIG. 3, it is assumed that the content 308 is sufficiently within reach of a user to enable the user to touch, reach, or otherwise point to desired content items. For example, the content 308 may be printed on an item (e.g., on an item label) that the user is holding. In another example, the content 308 may be provided on a wall or presentation surface, with the user standing nearby.

When the user includes the pointer 311 within a FOV of the HMD 302, then the framed content 310b includes at least a portion of the pointer 311, as shown. Consequently, it may occur that the pointer 311 partially or completely covers or occludes one or more content item, or otherwise identifies (e.g., points to) one or more content items. For example, in FIG. 3, the pointer 311 is illustrated as occluding the content item '4.'

As further illustrated in FIG. 3, the HMD 302 may be configured to capture framed content 310a as a first image 312a, and, at a different point in time, may capture framed content 310b as a second image 312b, where example techniques for framing the content 308 are provided below. As a result, and as shown, the second image 312b includes a pointer image 311a, and omits the occluded content item '4.'

Using the first image 312a and the second image 312, the content reader 306 may be configured to determine that a location (e.g., coordinate position) of the pointer image 311a in the second image 312b corresponds to a location (e.g., coordinate position) of the content item '4' in the first image 312a. Consequently, at the third point in time corresponding to content 108c in FIG. 3, the content reader 306 may provide output identifying the occluded, or otherwise identified, content item '4.'

In the example of FIG. 3, identification of the content item '4' includes a display of the occluded content item within a superimposed content item image 314. That is, as shown, the content reader 306 enables and causes a display of the occluded content item within a FOV of the HMD 302.

Although the superimposed content item image 314 is illustrated as a visible display, it will be appreciated that the content reader 306 may provide multiple types of readings or other outputs of, or uses of, the occluded content item '4.' For example, additionally or alternatively to the superimposed content item image 314, the content reader 306 may provide an audible reading of the occluded content item '4', using speakers or other suitable audio output of the HMD I/O hardware 304.

In example operations, then, a user may view the content 308, point to the content item '4', and thereby easily have the content item '4' read out audibly and/or displayed visibly, even while being occluded by, e.g., the user's finger. When the content 308 includes a word, or multiple words in a line of text, the user may point to specific words to have the words read out, or the user may trace the user's finger along the line of text to have the entire line of text read out.

When the content 308 includes a touchpad, keyboard, or similar interactive interfaces, the user may thus be provided with an ability to identify, and therefore effectively use, any desired element(s) of such interfaces. For example, when the content 308 is included on a computer keyboard, a user may place their finger on a key and be provided with an audible readout of that key, so that the user may make effective use of the keyboard, even if the user is a BLV user. Moreover, the user may conduct multiple successive interactions with the keyboard to select desired keys and otherwise utilize the keyboard. These advantages may be obtained across virtually any style, size, or layout of keyboard, even if the content reader 306 has not previously encountered or examined the keyboard being used.

In the example of FIG. 3, the content reader 306 is illustrated as including a head tracker 316, which is configured to track movement of the HMD 302 relative to the content 308, so as to continuously, consistently, and accurately identify and track the individual content items of the content 308. For example, as the user moves their head, and thus the HMD 302, a field and angle of view of the HMD 302 (e.g., of a camera of the HMD hardware 304) may also change. The head tracker 316 performs tracking of a coordinate system as the user's head moves relative to the content 308, and is therefore able to track, for example, that a particular content item is the same content item as such movement occurs.

Without tracking operations of the head tracker 316, the content reader 306 may lose accuracy, suffer reduced latency, and/or suffer increased battery drain. For example, without such head-tracking operations, the content reader 306 may fail to distinguish between two similar or same content items, or may be required to repeatedly recalibrate in order to minimize or avoid such errors (thereby leading to increased latency and battery usage).

In some implementations, described below, the head tracker 316 may implement template tracking, in which an initial image of the content 308, such as, or similar to, the first image 312a, is used as a template. Then, subsequent content images may be tracked with respect to the template image. However, other head tracking techniques may be used, as well.

A pointer tracker 318 is used to track the pointer 311, e.g., a finger of the user. Again, multiple pointer tracking techniques may be used. For example, machine learning classification techniques may be used to identify a hand (and individual fingers) of a user. In other examples, detectable elements of the pointer 311 may be tracked, such as when the pointer 311 represents a finger and the pointer tracker 318 tracks a fingernail of the finger being used. In other examples, a detectable element may be attached to the user's finger, or to a stylus or other pointing element, to enable pointer (e.g., finger) tracking.

A capture manager 320 represents one or more components configured to capture images of the content 308, including the images 312a, 312b, using a camera of the HMD I/O hardware 304. Capturing may be performed based on an explicit command from a user, or may be performed automatically in response to a detected event, such as a specific framing of the content 308.

The capture manager 320 may be further configured to perform text detection and OCR when the content 308 includes written text. More generally, the capture manager 320 may be configured to use any content recognition or content item recognition technique(s) suitable for a type of content being recognized.

For example, as referenced above, the capture manager 320 may be configured to use various machine learning or artificial intelligence techniques to capture, interpret, or otherwise utilize the content 308. For example, when the content 308 includes images, the capture manager 320 may be configured to recognize image elements as individual content items. For example, the capture manager 320 may perform image recognition using a suitable trained machine learning model (e.g., a convolutional neural network, or CNN). The capture manager 320 can also perform paragraphing, as described herein, to determine a structure and ordering of the individual content items of the content 308, such as the structure and ordering of a document.

The capture manager 320 may further be configured to facilitate and implement framing of the content 308, in order to ensure that desired aspects of the content 308 are captured and utilized in a desired manner. That is, the capture manager 320 may assist in setting the framing boundaries of the framed content 310a, 310b, 310c, to ensure, in the simplified example of FIG. 3, that the various content items '1, 2, 3, 4' are entirely and consistently included in captured images. Such framing can also be performed in other operation modes of the content reader 306 (e.g., a hold-to-read mode and/or a look-to-read mode).

The capture manager 320 may interact with a user to assist in obtaining desired and suitable framing. For example, to assist a BLV user, the capture manager 320 may provide audible instructions, such as instructions to move to the left or right, or to move nearer or farther from the content 308. Similarly, the capture manager 320 may provide framing instructions in a native language of a user who is attempting to interact with content in a different language. An example framing flow that can be implemented by the described content readers is discussed in further detail below with respect to FIG. 12.

Although illustrated as a rectangle in FIG. 3, a size, shape, and other aspects of the framing boundaries may be configured in any desired or suitable manner. For example, framing may be executed in part based on expected or actual dimensions of the content 308, a percentage amount of the FOV of the HMD 302 used by the content 308, a font size of text of the content, etc.

Image storage 322 represents one or more types of memory used to store images captured by the capture manager 320. For example, a captured image such as the first image 312a may be used to perform OCR. In other examples, a camera of the HMD I/O hardware 304 may capture video of the content 308, and the image storage 322 may represent a buffer storing individual frames of the captured video.

A coordinate mapper 324 may be configured to map coordinates between multiple images, e.g., multiple image frames, and thereby relate, e.g., a location of the pointer image 311a in the second image 312b, to a corresponding location in the first image 312a, at which the content item '4' is located. In other words, by determining that the pointer image 311a and the content item '4' are both located at corresponding locations within the second image 312b and the first image 312a, the coordinate mapper 324 enables identification of content item(s) that are occluded by the pointer 311 in the framed content 310b.

Consequently, an output generator 326 is provided with an ability to provide various forms of output related to the occluded content item, and notwithstanding its current occlusion. For example, as referenced above, the output generator 326 may be configured to provide an audible reading of the occluded content item '4', using the previously-determined OCR output of the capture manager 320 and associated TTS functionality.

As also referenced above, and as described in more detail, below, the output generator 326 may provide many other types of output. For example, in addition to simply reading out occluded content items, the output generator 326 may provide related instructions, such as instructions for how to use a button or other interface element on which the occluded content item is printed.

The output generator 326 may also directly provide a function associated with the occluded content item. For example, when an occluded content item is text that is also a website link, the output generator 326 may provide access to the linked website. Similarly, when the occluded content item includes a phone number, the output generator 326 may cause a smartphone connected to the HMD 302 to dial the phone number. When the content 308 includes an image, and the occluded content item is an image portion or image element, the output generator 326 may provide a written or audible description of such an image portion or element. When the content 308 is a consumer product, the output generator 326 may provide a written or audible description of the product to which a user is pointing with the pointer 311.

As referenced, FIG. 3 represents a simplified example that is provided for the sake of illustration, explanation, and example, and the description of FIG. 3 herein, or the description of any of FIGS. 1-14, is not intended to be limiting or exhaustive. For example, although the above description describes examples with image capture and associated OCR that occur with respect to the content 308a at a first time that is prior to occlusion by the pointer 311 of the content 308b at a second time, it may also occur that OCR operations occur following a time of removal of the pointer 311.

More generally, the time series of the content 308a, 308b, 308c of the content 308 is not limited to the order shown, and may include additional points in time (and associated content images captured), before, during, or after the particular points in time illustrated in FIG. 3. When multiple individual frames of captured video are stored in a buffer, the capture manager 320 may store a number of unoccluded frames in the buffer, and the output generator 326 may select a best-available frame to use in recognizing or reading a currently occluded or selected content item. For example, such a selection may be made in response to a command/request from the user, or automatically in response to an external trigger (e.g., after the user's finger pauses for a pre-determined time, such as one second).

Figure 4:
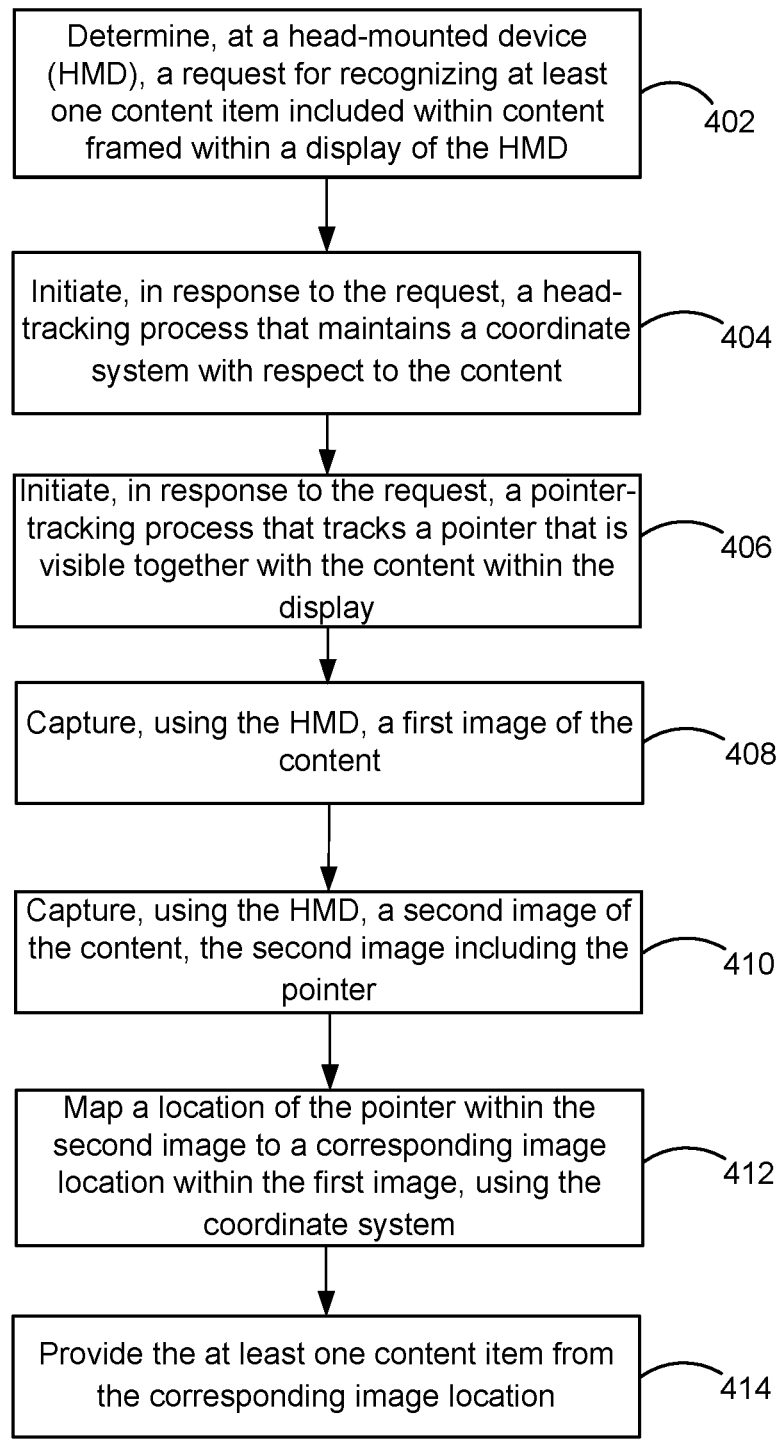
FIG. 4 is a flowchart illustrating example operations of the HMD of FIG. 1 and/or the system of FIG. 3.

FIG. 4 is a flowchart illustrating example operations of the system of FIG. 3. In the example of FIG. 4, operations 402-412 are illustrated as separate, sequential operations. However, in various example implementations, the operations 402-412 may be implemented in an overlapping or parallel manner, and/or in a nested, iterative, looped, or branched fashion. Further, various operations or sub-operations may be included, omitted, or substituted.

In FIG. 4, at a HMD, a request for recognizing at least one content item included within content framed within a display of the HMD may be determined (402). For example, in FIG. 3, a user of the HMD 302 (or the HMD 102) may request a reading or other output of the content 308, where the type of output depends in part on the content type of the content 308. That is, as explained above, content may include text, images, graphs, product information, or other types of content, so that included content items may include words, image elements, graph elements, or other corresponding types of content items.

The request may be received as an explicit request from the user. For example, the user may access suitable input components of the HMD I/O hardware 304. For example, the user may utilize a touchpad or button on the HMD 302. In other examples, the use may speak the request audibly, for detection by a microphone of the HMD I/O hardware 304.

In still other examples, the request may be received by way of implicit inference by the content reader 306. For example, the content reader 306 may interpret that a request has been received in response to a defined type of framing of, or pointing to, the content 308, or viewing the content 308 for a threshold amount of time. For example, the request may be inferred when a pre-defined type of content (e.g., text) is framed for more than a defined time threshold (e.g., 1 second), and/or when the user points to specific content items for more than a defined time threshold. For example, the capture manager 320 may be configured to interpret these and other types of requests.

In response to the request, a head-tracking process that maintains a coordinate system with respect to the content may be initiated (404). For example, the head tracker 316 may implement a head-tracking process that tracks movements of the user's head, on the assumption that the HMD 302 moves together with the user's head (and body), relative to the content 308. In various implementations, any suitable type of 2D or 3D tracking may be used.

In example implementations, the head tracker 316 may utilize template tracking to perform the head-tracking process. In template tracking, an original portion or frame of the visible content is captured to be used as a template. Then, even as the HMD 302 and its camera move, subsequent captures of the visible content may be related back to the image template. For example, subsequent images or frames may be searched to identify the image template (or portions thereof) contained therein.

In response to the request, a pointer-tracking process may be initiated that tracks a pointer that is visible together with the content within the display (406). As referenced above, the pointer may include a finger of the user of the HMD 302, or of another user, or may include a pointing instrument held by a user. The HMD 302 may use the HMD hardware 304 (e.g., camera) and the capture manager 320 to capture an image with the pointer 311 included, and to recognize the pointer 311.

As described herein, the head-tracking process and the pointer-tracking process may be configured to be executed together, in an overlapping or parallel fashion. For example, both tracking processes may be active at a same or overlapping time(s).

Using the HMD, a first image of the content may be captured (408). For example, the HMD 302 may capture the first image 312*a*. As described herein, image capture of the first image 312*a* may occur before, during, or after commencement of the head-tracking process and/or the pointer-tracking process. The image capture of the first image 312*a* may include OCR of the visible content or other processing of the visible content.

Using the HMD, a second image of the content may be captured, the second image including the pointer (410). For example, the HMD 302 may capture the second image 312*b*, including the pointer image 311*a*. As described, the pointer 311 may partially or completely occlude one or more content items of the visible content.

A location of the pointer 311 within the second image may be mapped to a corresponding image location within the first image, using the coordinate system (412). For example, the coordinate mapper 324 of FIG. 1 may perform collision detection of a location of the pointer image 311*a* in the second image 312*b* with a corresponding location within the first image 312*a*, which would map to a location of the content item "4" within the first image 212*a*. In this way, the content item "4" may be identified as being pointed to, even when partially or completely occluded by the pointer 311.

Thus, the at least one content item may be provided from the corresponding image location (414). For example, the at least one content item "4" may be audibly read out, using TTS techniques and/or using previous OCR operations performed in conjunction with the capture of the first image 312*a*. In some implementations, such when implementing a product identification function, the pointer 311 may be used to indicate the content 308 as a whole (a packaged product), rather than an individual content item included in the content 308.

As referenced, many different implementations may be used to provide the at least one content item. For example, the at least one content item may include alphanumeric symbols associated with a function, such as placing a telephone call or opening a website, and the providing of the at least one content item may include providing the function.

In other examples, there may be two or more pointers within the second image 312*b*, and corresponding content items may be provided for both. For example, when the visible content includes a computer keyboard, a first pointer (e.g., finger) may point to a letter key, while a second pointer may point to a shift key, so that a combination of the letter key and shift key may be detected and a corresponding capital letter may be selected. In other implementations, for example, multiple fingers may be used to identify specific words or other content, such as by identifying a word between two fingers in a pinch gesture, or identifying a word(s) between two fingers being spread apart.

As described, the head-tracking process and the pointer-tracking process can happen simultaneously, in parallel, or in an overlapping fashion, e.g., may be active at a same time(s). Therefore, for example, coordinates of the pointer 311 may be maintained with respect to the visible content 308 (and individual content items thereof) throughout multiple readings or other outputs of content items, and without requiring recalibration or unwanted, redundant readings of content items.

For example, using the system of FIG. 3 (e.g., in a touch-to-read mode), it is not necessary for a user to pause their finger while identifying content for reading. Instead, the user may move their finger from one location to another within the framed, tracked text, and the text pointed to may be immediately read out at a high level of granularity. Even if the pointer 311 moves out of frame and returns, reading of identified text may continue.

Figure 5A:
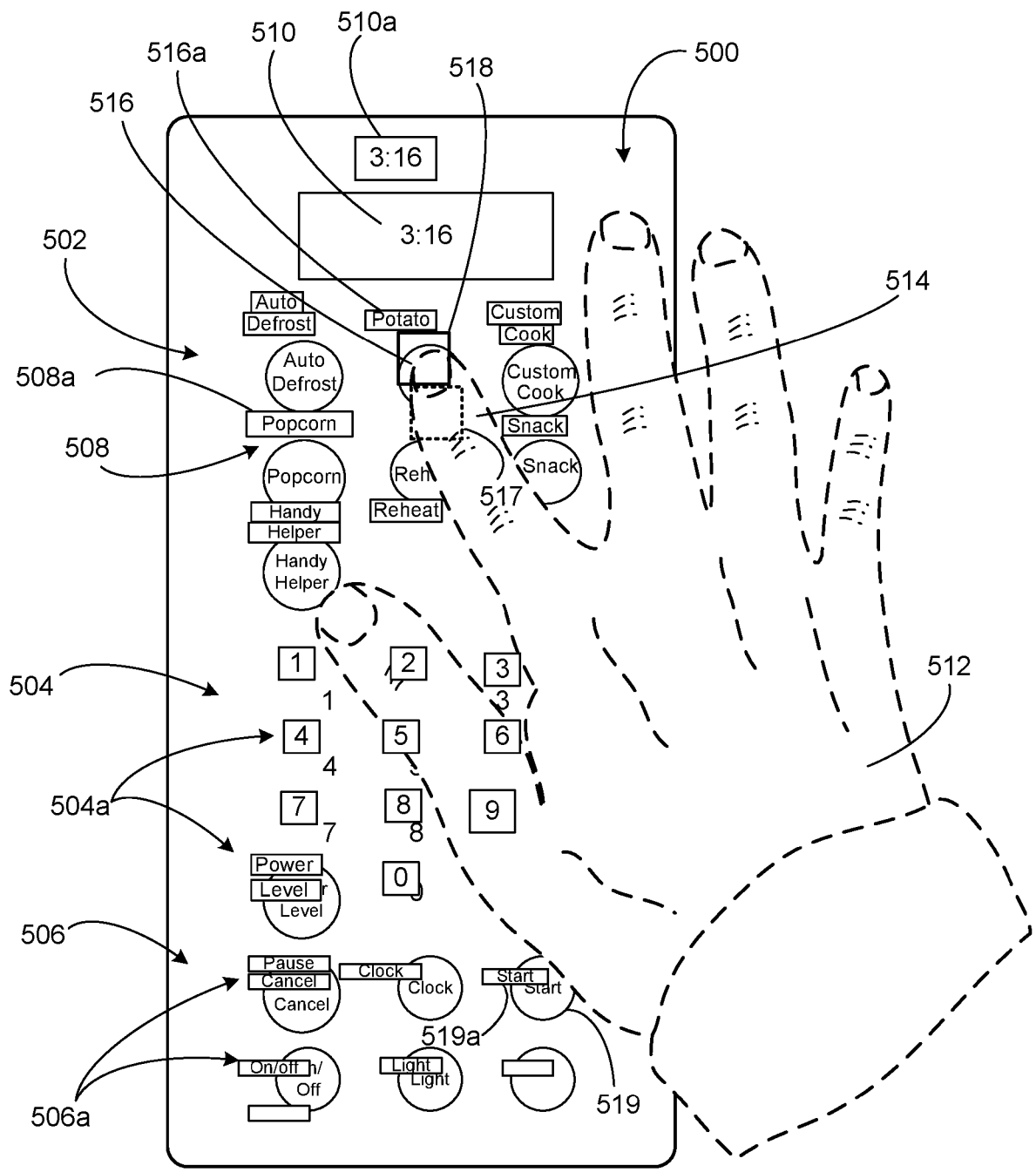
FIG. 5A illustrates an example HMD display according to example implementations.

FIG. 5A illustrates an example HMD display according to example implementations. In FIG. 5A, the HMD display shows a microwave control panel 500. Included visible content 502 therefore includes various individual content items related to providing the functionality of the microwave control panel 500. While FIG. 5A (and FIG. 5B) are described with reference to use of a microwave control panel, it will be appreciated the described approaches can be used by a user of a HMD to access other types of content, such as those described herein.

In the example of FIG. 5A, a section 504 includes individual numerals on corresponding buttons for, e.g., setting a timer for a timed cooking function of the microwave. A section 506 includes content items on corresponding buttons for general operational functions of the microwave, such as buttons for starting/pausing/canceling cooking operations, operating a clock or light, or setting a power level. A section 508 includes content items on corresponding buttons for more specific cooking operations, such as specialty functions for defrosting, reheating, cooking popcorn, heating a beverage, or performing a custom cooking operation. The microwave control panel 500 also includes a clock 510.

Thus, it will be appreciated that the microwave control panel 500 includes conventional content and individual content items, selected merely to provide an example of operations of the HMD 102 of FIG. 1 and/or the system of FIG. 3. Many other types of microwave control panels, and many other types of control panels and interfaces in general, may be used, including ATMs, computer keyboards, televisions, washer/dryers, and any household or industrial appliance. Also, other types of content can be accessed using the described approaches.

In the example of FIG. 5A, each section and included content items have superimposed content items provided within the HMD display, and described and illustrated above with respect to superimposed content item 514. For example, the content items in the section 504 have superimposed content items 504a, the content items in the section 506 have superimposed content items 506a, the content items in the section 508 have superimposed content items 508a, and the clock 510 has superimposed clock 510a.

Further in FIG. 5A, a user's hand 512 is illustrated as being included, and as occluding a number of the various content items. In particular, an index finger 514 of the hand 512 is illustrated as pointing to, and occluding, a content item 516 having corresponding superimposed content item 516a displayed within the section 508.

FIG. 5A, and the above discussion thereof, provide example results of operations of the content reader 306 of FIG. 3, including the head tracker 316, the pointer tracker 318, the capture manager 320, and the coordinate mapper 324. For example, as described with respect to FIGS. 3 and 4, and in more detailed examples below with respect to FIGS. 5B, 6 and 7, the various superimposed content items 504a, 506a, 508a, 510a, 516a, as well as 519a discussed below, may be obtained using OCR results obtained by the capture manager 320 from a captured image of the microwave control panel 500.

These OCR results are overlaid in the desired, illustrated positions, using the head-tracker 316. In FIG. 5A, the OCR results (including superimposed content items) are overlaid adjacent to, but not overlapping with, corresponding content items. In other implementations, OCR results may be displayed in any suitable or desired positions, including in overlapping positions with corresponding content items. As also shown in FIG. 5A, the superimposed content items may be displayed in desired positions, even when their corresponding content items are fully occluded by the user's hand 512 or finger 514 (e.g., may be shown superimposed on the hand 512 or finger 514).

In specific examples referenced herein, template tracking may be performed as an example implementation of head-tracking. For example, as referenced, the head-tracker 316 may obtain an initial template from a frame segment of a frame or image captured by the capture manager 320, and may then attempt to match that template to subsequent image frames.

Thus, when performing head tracking in the example of FIG. 5A, the head tracker 316 may perform template tracking, including outputting four points of a quadrilateral that are computed to match corresponding points within an initial frame. Then, the four points from the current frame of FIG. 5A, and from the initial frame, may be used to compute a homography transform between the two images/frames.

As the pointer tracker 318 is currently performing finger tracking of the finger 514, the resulting homography transform may be used by the coordinate mapper 324 to transform a current finger position into a coordinate space of the original captured image, which thus corresponds with the coordinates contained in the OCR results. Accordingly, collision detection is enabled between the finger 514 and any text in the OCR results.

In other words, for example, the homography transform may input a tracked finger position in conjunction with an initial detection box and a current detection box. The homography transform may then provide a finger position having coordinates that correspond to OCR results, e.g., a finger position in a text space.

Accordingly, in FIG. 5A, a box 517 illustrates results of finger tracking by the pointer tracker 318. A box 518 represents a transformed finger tracking box, or finger position in text space, using the homography transform described above. As shown, the box 518 correctly intersects with the content item 516 ("potato"), which the finger 514 is on top of (occluding).

As a result of the pointing action, the HMD 302 (or the HMD 102) may audibly read out the content item 516 (i.e., "potato") in addition to displaying the superimposed content item 516a. In this way, the user may receive instructions and assistance in identifying and selecting the underlying microwave button for providing a functionality associated with the content item 516 (e.g., cooking a potato in the microwave).

Figure 5B:
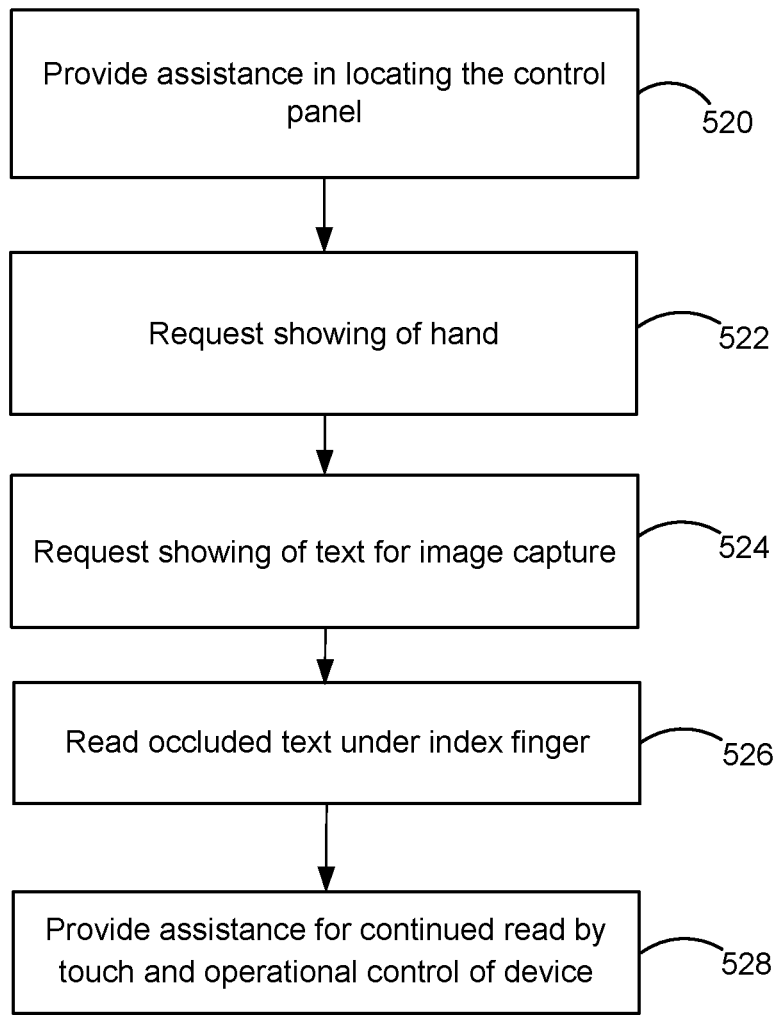
FIG. 5B is a flowchart illustrating example operations of the example of FIG. 5A.

In the related example operational flow of FIG. 5B, the HMD 302 may provide assistance in helping a user frame the microwave control panel 500, and in implementing desired functionalities of the microwave control panel 500. For example, in FIG. 5B, the HMD 302 may initially provide assistance in locating the microwave control panel 500 (520).

For example, the HMD 302 may provide audible instructions such as, "to start, find the control panel of your appliance; when ready, tap touchpad to continue," with reference to a touchpad or other input of the HMD I/O hardware 304. A user may find the control panel by sight, or, in the case of a BLV user, by touch.

The HMD 302 may then request a showing of the user's hand 512 within the framed control panel (522). For example, the HMD 302 may provide audible instructions such as, "hold up your hand with your arm extended," "place your hand on the control panel," and/or "look at your hand." The HMD 302 may then provide audible indication of the hand being detected.

The HMD 302 may then request a showing of the text for image capture (524).

For example, the HMD 302 may provide audible instructions such as, "move your hand away for a few seconds," and then, following image capture, may provide an audible indication thereof.

The HMD 302 may then provide an audible reading of specific text occluded by the detected index finger 514 (526). For example, the HMD 302 may provide audible instructions such as, "place your hand back onto the control panel to hear the text under your index finger read."

As described above with respect to FIGS. 3 and 4, the HMD 302 may then proceed to provide assistance for continued read by touch operations and associated operational control of the device (e.g., microwave oven) (528). For example, the HMD 302 may have received a request from the user for cooking a potato. The HMD 302 may instruct the user to move their hand in an indicated direction (e.g., up, down, left, right) until the index finger occludes the content item 516, "potato." Then the HMD 302 may provide an instruction to press the underlying button of the microwave control panel 500.

Continuing, the HMD 302 may provide further direction to assist in finding the start button under content item 519 within the section 506, and associated with superimposed content item 519a. Again, the HMD 302 may provide instruction to press the underlying button once the index finger 514 is detected as occluding the content item 519.

Thus, the example techniques of FIG. 5B may be used to assist a BLV user in operating functionalities of the microwave control panel 500. For a sighted user, the HMD 302 may provide similar assistance as well, such as when a cooking operation requires multiple steps that are unknown to the user. Then, the HMD 302 may provide step-by-step instructions for obtaining the desired functionality. In related implementations, the HMD 302 may provide visual directional elements, such as arrows or highlighted superimposed content items, to assist a user in locating a desired content item or associated button/functionality.

In other examples, the user may be provided with an ability to read the microwave control panel 500 in a native language of the user. For example, the various content items of the content 502 may be provided in a first language, but the various superimposed content items (e.g., 504a, 506a, 508a, 510a, 519a) may be provided in a native or specified language of the user.

In FIG. 5A, the various superimposed content items 504a, 506a, 508a, 510a, 519a are provided proximate to their corresponding content items 504, 506, 508, 510, 519. In other implementations, superimposed content items may be provided separately, e.g., may be provided together in another display, or display portion.

FIG. 5B provides example operations related to a user experience of using the HMD 302 to interact with the microwave control panel 500. Not explicitly discussed with respect to FIG. 5B, but understood from the above discussions of, at least, FIGS. 3 and 4, are related operations of the HMD 302 in providing the described head-tracking process and pointer-tracking process, as well as the associated OCR process, which enable the functionalities described with respect to FIG. 5B.

For example, FIG. 6 illustrates the head-tracking process, pointer-tracking process, and OCR process, and related example operations, which may be used to provide, for example, the user experiences described above with respect to FIGS. 3A and 3B, or similar experiences with other types of content. As shown in FIG. 6, the HMD 302 may initially receive a command 602 to initiate a HMD's touch-to-read mode from a user. The user may proceed to look at the content to capture (604), or, if no user action is detected after a wait period (e.g., 3 seconds), then an audible instruction 606 may be provided, such as, "Look at what you want to read and double-tap to capture it. Keep the item in view." A double tap command 608, or other suitable command, may then be received to initiate a camera on action 614.

Alternatively, the user may provide an initial command 610 to initiate the process. Then, the HMD 302 may acknowledge the command 610, e.g., audibly, by outputting "Ok, touch to read." The camera on action 614 may then be implemented.

The HMD 302 may output an audible notification 616 that capturing of the content is occurring, or is about to occur. Then, a notification 618 may be provided that the capture process is complete.

An OCR process 620 of the captured content may then proceed. If a latency threshold is exceeded, a notification 622 may be provided to alert the user that the OCR process is proceeding.

In the example of FIG. 6, overlapping with the OCR process 620, both a template tracking process 624 and a finger tracking process 626 are initiated, as examples of the head-tracking process and pointer-tracking process, respectively, of FIG. 3. As shown, the tracking processes 624, 626 may proceed in parallel with one another.

Within a time following the OCR process 620 and during both the tracking processes 624, 626, the HMD 302 may provide a notification 628, such as an audible notification, to touch the captured text to initiate a desired reading thereof.

Then, following a detection 630 of a finger overlap with a text box identified from the OCR process 620 and identifying a content item, the HMD 302 may provide an output 632 to read or otherwise provide the pointed-to content item. As referenced above, and illustrated explicitly in FIG. 6, the user may continue to move their finger to different content items within the content as long as the tracking processes 624, 626 continue, as shown by a subsequent detection 634 of a second finger overlap with another text box identified from the OCR process 620 and identifying another content item, and the HMD 302 then providing an output 636 to read or otherwise provide the pointed-to second content item. As also shown in FIG. 6, at any time during a touch-to-read window of time following completion of the OCR process 620 and occurrence of the tracking processes 624, 626, a user may pause the operations with a single tap 638 or other suitable command.

As may be further observed from FIG. 6, only the single OCR process 620 is needed to obtain the multiple (as many as needed or desired) readings of different content items within the content. However, as shown by the double tap command 640, the user may easily initiate a second or subsequent image capture of the same or different content.

Otherwise, at any time, a hush command 642 or other stop action may provide a corresponding notification 644. Then, a camera off action 646 may coincide with completion of the tracking processes 624, 626 and of the touch-to-read functionality, as shown.

Described techniques are highly efficient and low latency. For example, the finger tracking process 626 may be conducted using a relatively lower resolution and frame-per-second capture mode than the OCR capture process, which may utilize a higher resolution to ensure accurate OCR results. Meanwhile, frames used in the template tracking process 624 may use frames that have been downscaled, to improve tracking latency.

Figure 7:
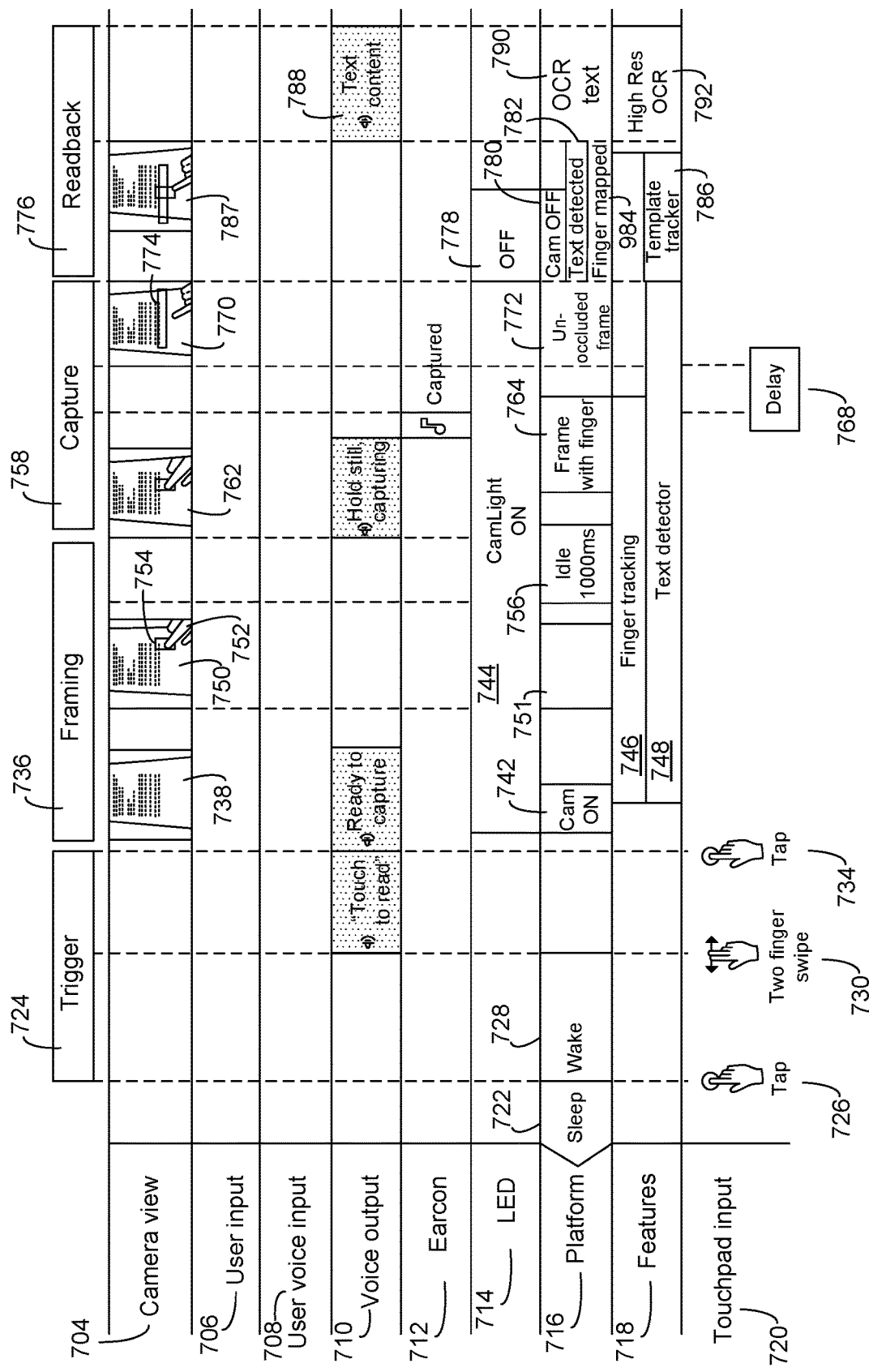
FIG. 7 is a timing diagram illustrating example operations of the system of FIG. 3.

FIG. 7 is a timing diagram illustrating example operations of the system of FIG. 3. In FIG. 7, various HMD aspects 702 include a camera view 704, user input 706, user voice input 708, voice output 710 (e.g., audio instructions, readback, etc.), earcon 712 (e.g., audio prompts, notifications, etc.), LED indicator 714, platform 716, features 718 of the content reader 306 of FIG. 3, and touchpad input 720.

In FIG. 7, following a sleep phase 722, a trigger phase 724 may be initiated by a tap operation 726 or other suitable wake operation. In the trigger phase 724, a wake period 728 is followed by a two-finger swipe operation 730 or other suitable selection operation, causing a voice output 732 of 'touch to read,' thereby indicating to the user that desired content should be framed (e.g., using techniques described above, or other suitable framing techniques).

Accordingly, a tap operation 734 or other initiation command initiates a framing phase 736. During framing, content 738 is viewed using the HMD 302 and a voice output 740 of 'ready to capture' is generated.

The platform 716 performs an operation 742 to turn on an included camera, and the LED 714 is turned on as part of an operation 744. As shown, the camera light ON operation 744 continues as finger tracking 746 and text detection 748 commence.

Subsequently, in a frame 750, the platform 716 is able to perform a find finger operation 751 to identify or find a finger 752 of the user within the frame 750. A text box 754 may then be displayed to indicate an area in which reading will occur in response to the presence of the finger 752.

If the platform 716 detects an idle period 756 (e.g., 1 second) during which the finger 752 is still, then a capture phase 758 may be triggered. In the capture phase 758, the voice output 710 may provide an audible indication 760 that image capturing is occurring. Specifically, an occluded frame 762 is captured by the platform 716 as frame 764, at which point the earcon 712 provides an audible indication 766 that capture is complete.

If desired, a delay period 768 may be provided, during which, for example, the user may move their hand or finger to provide an un-occluded frame 770. As may be observed and appreciated, un-occluded in this sense means merely that the previously-occluded text (e.g., in the text box 754) is now un-occluded, and does not require full removal of the finger 752 from the captured frame 770. Accordingly, the platform 716 may complete the capture of the un-occluded frame 772, including at least an un-occluded portion 774.

At this point in time, a readback phase 776 may commence. As shown, the LED 714 may be turned OFF 778, and in conjunction therewith, the platform 716 may perform an operation 780 to turn off the camera, as well.

Text detection 782 and finger mapping 784 may then be performed, using operations of the template tracker 786. Accordingly, text at previously-occluded location 787 may be identified. The platform 716 may perform an OCR operation 790 of the text, e.g., at the mapped location 787, perhaps using a high-resolution OCR process 792, and the voice output 710 may then provide an audible readout 788 of the recognized text.

As described above, in subsequent operations, additional touch-to-read operations may be conducted. For example, the camera of the platform 716 and the LED 714 may be reactivated, along with additional finger tracking. In this context, additional text detection and recognition may or may not be necessary, if previously detected/recognized text is still available.

FIG. 8 illustrates a process flow for providing a user of a HMD (such as the HMD 102 or the HMD 102) with a hold-to read experience, such as described herein. For purposes of illustration, the process flow of FIG. 8 will be described with general reference to a HMD that implements a content reader. As shown in FIG. 8, the HMD may receive a menu selection, such as from user navigation of the menu 210 in FIG. 2, to initiate the HMD's hold-to-read mode (802). The user may proceed to issue a double tap command (804) to issue a content framing process (812), or, if no user action is detected after a wait period (e.g., 3 seconds), then an audible instruction 806 may be provided, such as, "Double-tap to capture." Alternatively, the user may speak a command (808), such as "Hold" to the enter the hold-to-read operation mode. An audio confirmation, such as "Ok, hold to read" (810) can be issued by a content reader of HMD to confirm that the desired mode of operation is selected, The content framing process (812) can then be triggered by the user holding content within a FOV of the HMD (e.g., for a threshold period of time).

After the content is framed, an audio notification (814), such as "Hold still, capturing" can be issued to indicate that the framed content is being captured. Once content is captured, that content can then be analyzed using appropriate classification techniques, such as machine learning classification techniques, paragraphing, etc., to gain an understanding to the object from which content has been captured. For instance, such classification techniques can determine that the captured content includes content items of a consumer packaged product (816), such as a brand name, product name, Universal Products Code (UPC barcode), an ingredients list, etc. Once a specific product is identified, a summary of the identified product (818) can be provided to the user, such as using an audio output, in this example, "Lay's Cucumber Potato Chips." After or during the product summary, a swipe back gesture (820) can be made by the user, which can cause the previously provided content (product summary information) to be repeated, or started over.

Alternatively, the user can hold a second product (e.g., a different product), or a different content object within a FOV of the HMD, e.g., for a threshold period of time, which can then trigger another content framing process (824). Alternatively, the framing process (824) can be triggered in response to another double tap command (826), which could also occur after accessing content that is not included on a packaged product, or content from a packaged product that the HMD is unable to identify.

In the process of FIG. 8, if the captured content (814) is identified as something other than a packaged product, such as a document (832), or is a packaged product that cannot be identified using the classification techniques implemented by the HMD, the captured content can be analyzed to identify individual content items, such as using the approaches described herein, as well as to assign a structured order to the individual content elements based on classification of the individual content items, and/or classification of the captured content as a whole. An example the results of such an analysis is illustrated and described in further detail below with respect to FIGS. 9A and 9B. If latency occurs when analyzing the captured content, an earcon (834) can be issued, such as an alert tone, to indicate that the content is in the process of being analyzed. After (or while) the content is analyzed, a summery of the content (836) can be provided to the user, such as using an audio device of the HMD.

Alternatively, in some implementations, the summary (836) may not be provided, and the process of FIG. 8 can include starting content readback at the first content item of the ordered content items, such as with an audio message (834) "This is the first paragraph" that can be issued by the HMD. Depending on the specific content captured, the summary (836) and/or other information provided based on the analysis of that content will depend on the captured content. For instance, if the object from which content is captured is q currency note, the audio message (834) could be, "This is a $5 bill." If the content is an envelope, the message (834) could be "This is a letter from Sender to Recipient." If the content is a document, the content reader of the HMD can start reading the first paragraph (835), which can be based on the ordered arrangement of individual content items. A user can navigate between individual content elements of the content (840) using a swipe back gesture (842) to navigate to a previous content item, or a beginning of a content item, and a swipe forward gesture (844) to navigate to a next content item (in the ordered content item arrangement). In some implementations, spoken instructions can be used in place of swipe gestures. For instance, such spoken commands could include, but are not limited to, "Skip", "Next", "Back", "Previous", "Go to paragraph . . . ", "Go to beginning", "Go to end", and so forth.

In the example of FIG. 8, once the last content item has been accessed and completely read, or skipped over, using a gesture or command, an audio message (846) can be issued by the content reader of the HMD, indicating that the end of the content has been reached. That audio message can also provide instructions for the user to proceed to a next navigation action, such as indicating that swiping forward will go to the beginning of the currently captured content, or that a double tap command can be issued to capture different content. If a swipe forward command is issued, an earcon 850 can be played, indicating that the first content item of the currently captured content is again being accessed (readback, etc.). However, if the user does not further interact with the HMD for a period of time, e.g., 30 seconds, after accessing content using the process flow of FIG. 8, a timeout (828) or (852) can occur, and the HMD can enter Standby (830), or Sleep mode, so as to conserve battery power until functionality of the content reader is again requested or indicated as being desired by a user's action.

Block 860 in FIG. 8 illustrates example commands that, in some implementation, can be issued during the hold-to-read mode process of FIG. 8. For instance, a double tap command 862 during readback can initiate a new content capture process. As shown in block 860, a double tap command during framing can override the framing process and force capture of content, which could be used when framing isn't feasible, or to capture only a portion of content that is of interest, as two examples. As further shown in block 860, a single tap command 866 can be issued anytime during the hold-to-read experience to pause or resume content access.

FIG. 9A is a diagram illustrating an example of content that has been captured and analyzed by a content reader, such as using the approaches described herein. The example content in FIG. 9A is illustrated as a document 900, which is in the form a utility bill. The document 900 of FIG. 9A is provided by way of example, and for purposes of illustration. In example implementations, the results of analysis of content will depend in part, on the content being analyzed, the classification techniques applied, an intent of the user in accessing the content (e.g., packaged product identification, sorting mail, finding an aisle in store, an amount of content captured, and so forth).

Also in FIG. 9A, specific individual content items are illustrated as having been identified as a result of analysis of the content of the document 900. Again, these indications are given by way of example, and for purposes of illustration. In some implementations, additional individual content items could be identified, different groupings of content could identified, fewer content items could be identified, etc. As shown in FIG. 9A, there are nine (9) individual content elements indicated, 9-1, 9-2, 9-3, 9-4, 9-5, 9-6, 9-7, 9-8 and 9-9, which are indicated by respective bounding boxes. Depending on the implementation, such bounding boxes may or may not be rendered in a display of an associated HMD. As shown in FIG. 9A, in this example, the table of content item 9-8 may identified as 96 Billing History based on its heading. However, the data of the bar chart may not be readable using the content reader. In this instance, the content reader may provide a summary of the content item 9-8 during readback and navigation of the content items of the document 900.

As also shown in FIG. 9A, again by way of example, and for purposes of illustration, the individual content item 9-4 includes a content sub-item 9-4', specifically, previous unpaid balance information. In other examples, content sub-items can include things such as bulleted lists within a paragraph or document, a data table in a technical article, values in a table, etc. How a content reader provides access such individual content items will depend on the particular situation. For instance, a restaurant menu may be grouped with each section as an individual content item (e.g., appetizers, soups, salads, entrees, etc.), and each dish within a section being indicated as a content sub-item. The grouping and ordering of content items and content sub-items may determine, in some implementations, how navigation of the captured content is performed. For instance, continuing with the example of a menu, different gestures can be used to navigate analyzed content captured from the menu. For example, two finger swipe gestures could be used to navigate between sections of the menu, while single finger swipe gestures could be used to navigate between dishes of a section. In some implementations, continuing with the example of a menu, different spoken commands could be used to navigate the content items and content sub-items of the menu, such as "next section", "next dish", "what are the entrees?", and so on.

Figure 9B:
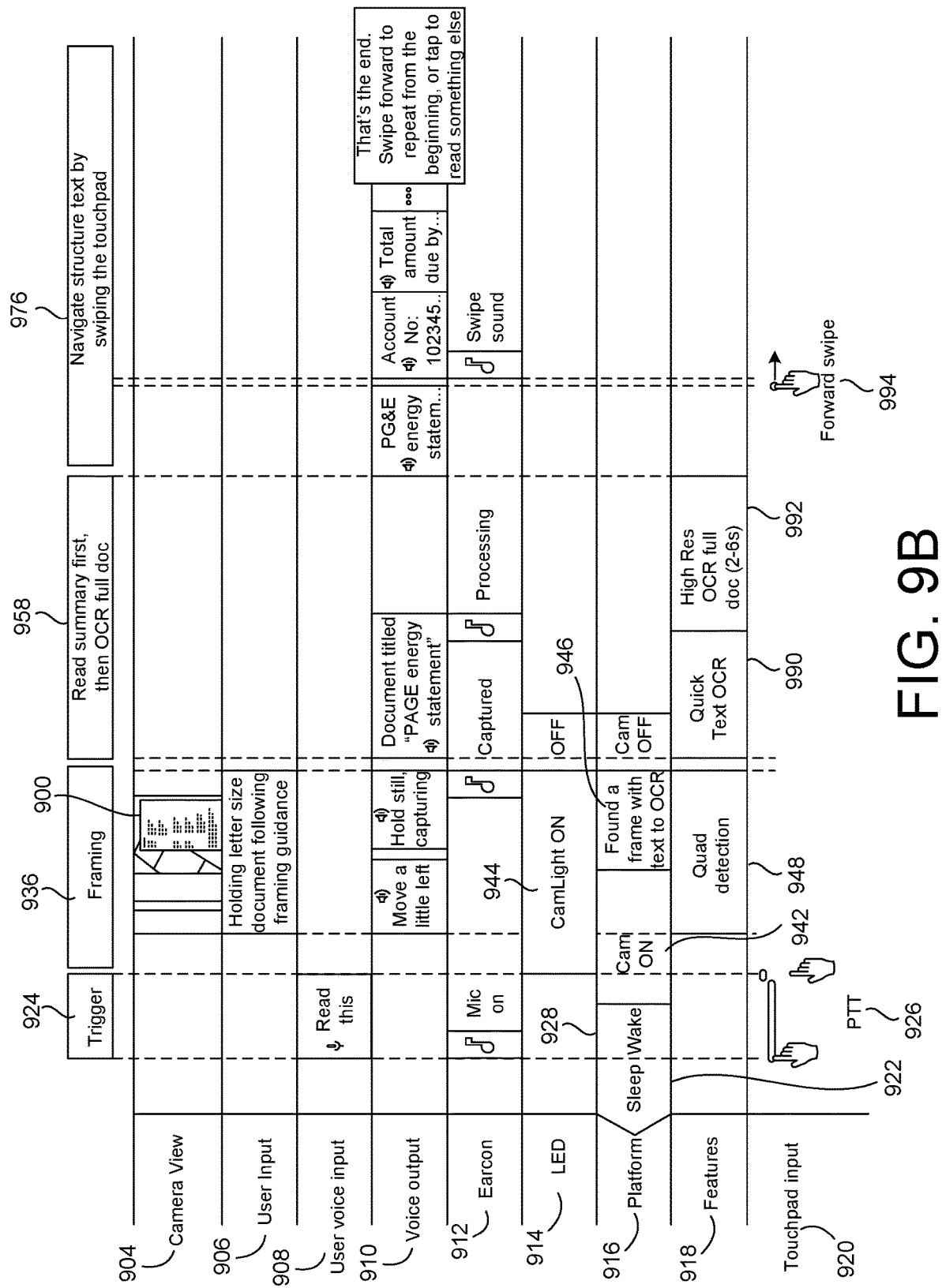
FIG. 9B is a timing diagram illustrating example operations of a content reader for accessing the content of FIG. 9A.

FIG. 9B is a timing diagram illustrating example operations of a content reader, e.g. the content reader 106 or the content reader 306, to capture, analyze and navigate/access the content of the of the document 900 of FIG. 9A. In FIG. 9B, as with the timing diagram of FIG. 7, various HMD aspects include a camera view 904, user input 906, user voice input 908, voice output 910 (e.g., audio instructions, readback, etc.), earcon 912 (e.g., audio prompts, notifications, etc.), LED 914, platform 916, features 918 of an associated content reader, and a touchpad input 920.

In FIG. 9, following a sleep phase 922, a trigger phase 924 may be initiated by a tap operation 926 or other suitable wake operation, such a user voice input 908 of "Read this" or navigating a menu (the menu 210) to select a hold-to-read mode of an associated content reader. In the trigger phase 924, a wake period 928 can be followed by a user input 906 of the user holding the document 900 within a FOV of the HMD, which can initiate a framing phase 936. During framing, the document 900 is viewed using the HMD and voice output 940 can be used to provide instructions to the user to properly position the document 900 so that it is framed in the FOV of the HMD. Again, an example of a framing process flow is illustrated and described in further details below with respect to FIG. 12.

The platform 916, at the start of the framing phase 936, performs an operation 942 to turn on an included camera, and the LED 914 is turned on as part of an operation 944. As shown, the camera light ON operation 944 continues until the content is indicated as framed by operation 946 of the platform 916. The content of the document 900 can then be captured and the camera and the LED can be turned off.

The content reader features 918 can then, during a summary and full document OCR phase 958, initially perform a quick text OCR 990 of a captured image of the document 900, and the voice output 990 can provide the document summary based on the quick text OCR, such as with a voice output 990 of "PG&E energy statement", which can be based on content item 9-1 of FIG. 9A. An earcon 912 can be issued after the content summary is issued to indicate that a full document high-resolution OCR (as well as content analysis, paragraphing/content item ordering) 992 is in process.

After analysis of the document 900's captured content, a navigation phase 976 can be initiated. For instance, finger swipe gestures 994 can be used to navigate between content items 9-1 through 9-9 of the document 900, as well as to navigate any content sub-items, such as content sub-item 9-4'. While forward swipe gestures are indicated in FIG. 9B, backward swipe gestures can also be used to move to previous content items. As with the process flow of FIG. 8, once the end of the last content item 9-9 is reached, of the last content item 9-9 is skipped, a voice output 910 can be issued indicating that the user can swipe forward to go back to the beginning, e.g., to the first content item, or can tap to read/capture something else. In some implementations, the user can hold another object in the FOV of the HMD to initiate, or trigger capture of new content.

In some implementations, user voice input 908 can be used to navigate between content items and content sub-items. For instance, commands such as "skip", "next", "previous", "back", "go to paragraph X", "how much is due?", etc., can be used as user voice input 908 to navigate content items of captured content, such as captured content of the document 900, as illustrated in FIG. 9A.

FIG. 10 illustrates a process flow for providing a user of a HMD (such as the HMD 102 or the HMD 302) with a look-to read experience, such as described herein. For purposes of illustration, the process flow of FIG. 10 will be described with general reference to a HMD that implements a content reader. As shown in FIG. 10, the HMD may receive a menu selection, such as from user navigation of the menu 210 in FIG. 2, to initiate the HMD's look-to-read mode (1002). The user may proceed to issue a double tap command (1004) to confirm the selection and turn on a camera of the HMD (1012). However, if no user action is detected during a wait period (e.g., 3 seconds) after selection of the look-to-read mode (1002) without confirmation, then an audible instruction 1006 may be provided, such as, "Look at what you want to read and double-tap to capture it." Alternatively, the user may speak a command (10060, such as "Look" to the enter the look-to-read operation mode. An audio confirmation, such as "Ok, look to read" (1010) can be issued by a content reader of HMD to confirm that the desired mode of operation is selected.

Once the camera is on (1012), content within a FOV of the HMD can be captured. A voice output (1014), such as "Capturing", can be issued to indicate that content capturing is in process. An earcon 1016 can then be issued to indicate that content capture is done. OCR (1018) can be performed on visible content (e.g., text) within the captured image. If a latency of greater than a threshold period of time, such as 1.5 seconds, is exceed for the OCR (1018), an earcon (1020) can be issued to indicate that OCR processing is being performed.

Once the OCR (1018) is done, content (text) in the captured image can be read (1022). However if no text is located in the captured image (1026), a voice output (1028), such as "Can't see anything to read. Double tap to capture something else" can be issued to inform the user that no readable content was identified in the captured image. After, or during reading of the content (1022), a double tap command can be issued to terminate the readback and capture something else. Also, during reading of the content (1022), a hush command (1032) can be issued to terminate content readback and the camera can be turned off (1034).

Figure 11:
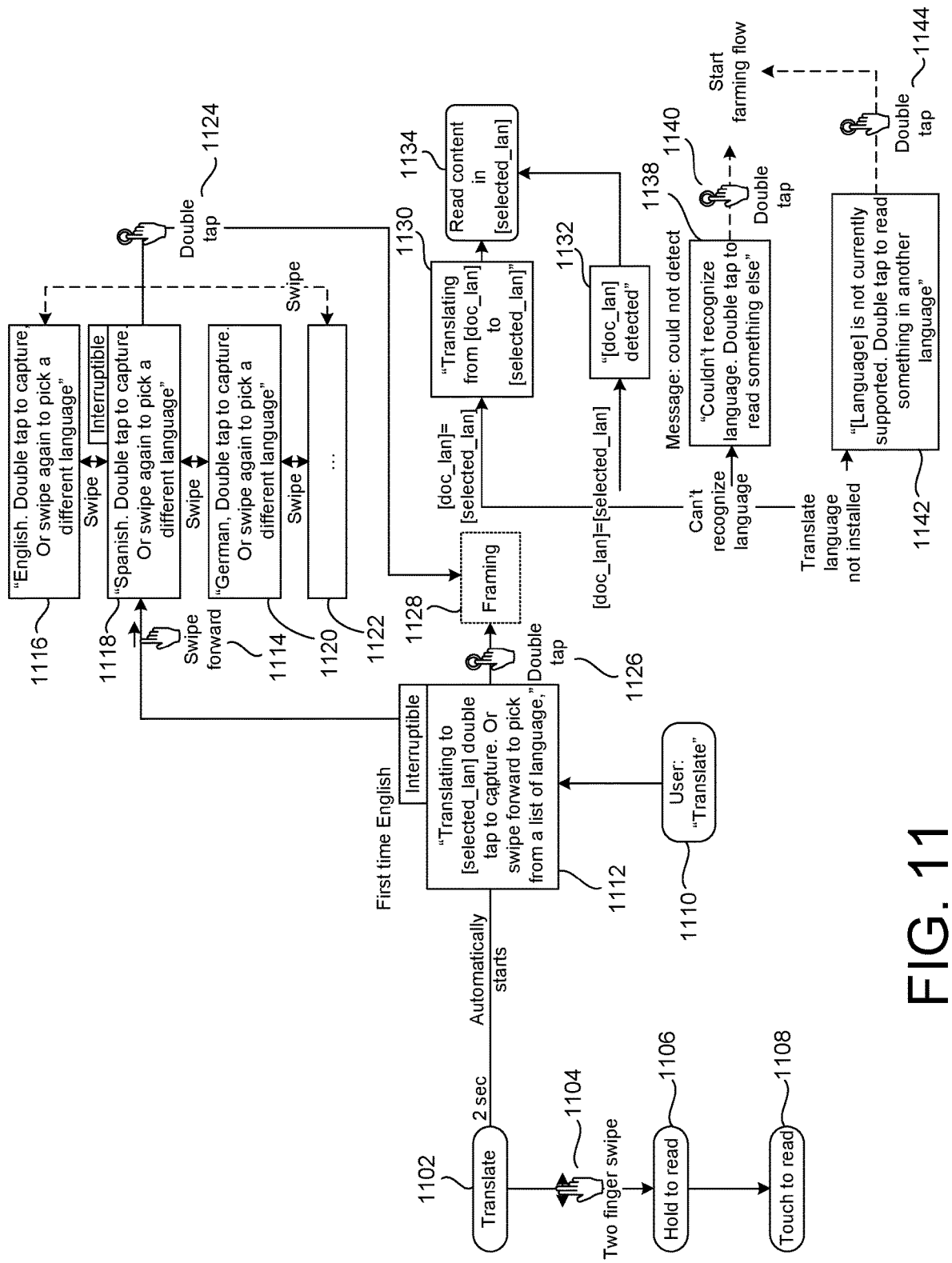

FIG. 11 illustrates a process flow for selecting a translate function (1102) of a content reader, which can be selected from a menu, such as the menu 210, using touchpad swipe gestures. A reader mode of the content reader can also be selected in combination with the translate function (1102), such as a hold-to-read mode (1106), or a touch-to-read mode (1108). While not specifically shown in FIG. 11, a look-to-read mode could also be selected in conjunction with translate function.

In this example, after a delay period, e.g., 2 seconds, the content translation function, if selected, may automatically start with a default translation language (1112). In the process flow of FIG. 11, the default translation language is shown as being English, but other default translation languages can be used. Alternatively to menu selection of the translate function, the user may speak a command (1110), such as "Translate" to activate the content translation function. An audio confirmation and instruction, such as "Translating to English. Double tape to capture. Or swipe forward to pick from a list of languages" can be issued by a content reader of HMD to confirm that the translate function is active, indicate what language is currently being used for translation, how to continue with the currently selected translation language, and/or how to select a different translation language.

As shown in FIG. 11, a forward swipe gesture (1114) can be used to access a menu of supported translation languages, and forward and reverse swipe gestures can be used to move between translation language selections, for which corresponding audio output messages can be issues. Such audio output messages can indicate a current translation language selection, that double tape will capture content, and that another swipe gesture will select a different translation language option. In this example, English (1116), Spanish (1118) and German (1120) are shown as options. Other supported languages can also be provided as translation options (1122). Selection of a translation language can then be confirmed by a double tap command (1124) or, if the default language is desired, a double tap command (1126) without navigation of the supported languages menu can be issued to select the default.

A content framing process (1128) can then be performed to frame content for capture and OCR. Once the content is captured and OCR is performed on the content, if the captured content (text) is in a supported language that is different from the translation language, an audio output (1130) can be issued indicating that the captured content is being translated from its original language to the selected translation language. If the captured content is in the selected translation language, an audio output (1132) can be issued indicating that the translation language was detected. After translating captured content to the selected translation language (1130) or determining that the captured content is in the selected translation language (1132), the content is then read back in the selected translation language (1134).

Figure 12:
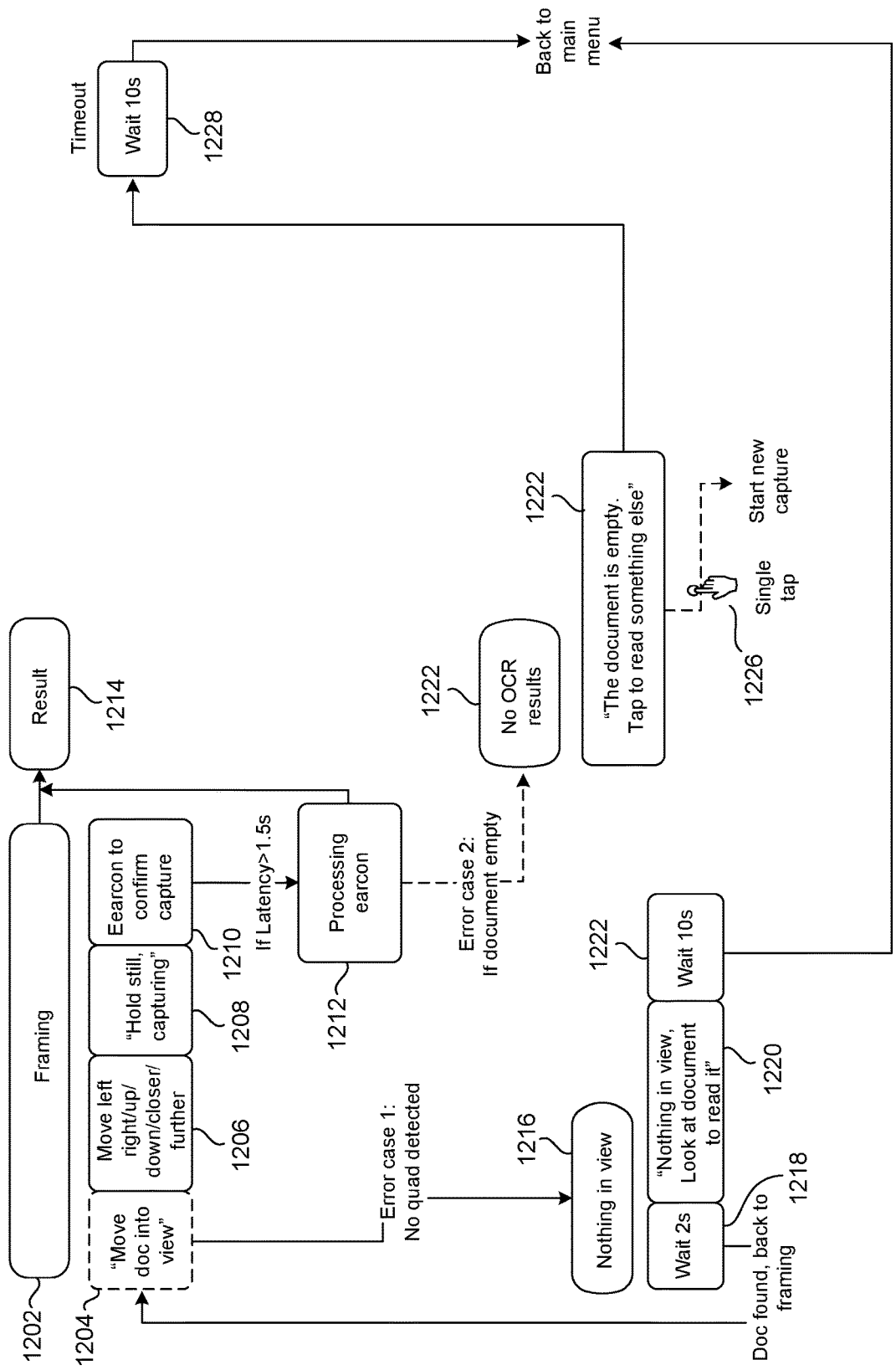

In this example, if the content reader cannot recognize the language of the captured content, an audio output (1138) can be issued indicating that the language of the captured cannot be recognized, and/or that the user can double tap (1140) to capture/read something else. Also in this example, if the content reader recognizes a language of the captured content, but that language is not supported for translation, an audio output (1142) can be issued indicating that the language of the content is not currently supported, and/or that the user can double tap (1144) to capture/read something else FIG. 12 illustrates a process flow for framing content within a FOV of a camera, such as a camera included in a HMD that is used to implement a content reader. As described herein, a framing process (1202) can be performed as part of a reader experience that is implemented by a content reader, such as the content reader 106 or the content reader 306. When framing content, the content (or an object including the content) can be, with respect to a camera used to capture the content, too far away, too close, or in an appropriate range of distances from the camera. The determination whether a distance of the content from the camera (e.g., an associated HMD) can be based on a percentage amount of a FOV of the camera that the content occupies (which can include applying aspect ratio factors for vertical and/or horizontal percentages). Furthermore, determining whether content is framed can be determined based on whether the content is within threshold distances of the edges of the FOV (which can prevent oscillation between being framed an unframed as a result of small movements of the content).

The content (e.g., a content containing object) can, in order to be considered framed, in addition to the criteria above, be wholly within the associated camera's FOV, which can be determined based on vertices of the object that are identified by, for example, a coordinate mapper of a content reader. When framing the content, independent of being too far or too close from the camera, the content can be one or more of partially of to the left, partially off the top, partially off the bottom, and/or partially off the right of the FOV of the camera. Accordingly, when framing content, appropriate instructions can be given, e.g., via audio outputs, to direct the user on how to move the content (or a HMD) so the content can be properly framed for capture.

Such commands can include move up, move down, move left, move right, mover further away, and/or move closer. Of course, other commands are possible, such adding qualifiers, such as "little", to commands, e.g. "move a little left", or combing commands, such a "move up and left."

As shown in FIG. 12, when framing (1202) content, an initial instruction (1204) can be provided as an audio output to instruct a user to bring a document (or other object) within view of a camera, e.g., of an associated HMD implementing a content reader. Once the document (or other object) is in view of the camera, directional instructions (1206) can be given to frame the associated content, such as the commands discussed above. When the content is framed, an audio output (1208), such as "Hold still, capturing" can be issued to indicate that the content has been framed and is being captured. Once the capture is complete, an earcon (1210) to confirm the capture can be issued. In some implementations, if there is capture latency, e.g., more than 1.5 seconds, another earcon 1212 can be issued to indicate that content processing is continuing. Once the capture process (and/or document analysis) is complete, a result 1214 can be provided for use in an associated reader experience.

If the document (or other object) is empty (does not include text content), an error 1222 can be indicated that no OCR results were obtained, and an audio output (1224) can be issued indicating that the document or object did not include any text content, and/or to tap to capture/read something else. If no action is taken with a threshold period of time (1228), e.g., 10 seconds in this example, a currently selected content reader mode can timeout, and operation can return to a main menu, such as the menu 210 of FIG. 2.

If a document (or other content containing object) is not moved into a FOV of a camera used to implement a content reader, an error (1216) indicating that nothing is in view can be issued or indicated. A wait time 1218 can be implemented (2 seconds in this example), and an audio output (1220) can be issued indicating that nothing is in view, and/or direct the user to look at a document (or other object) to read/capture it. If no action is taken within a threshold period of time (1221), e.g., 10 seconds in this example, a currently selected content reader mode can timeout, and operation can return to a main menu, such as the menu 210 of FIG. 2.

Figure 13:
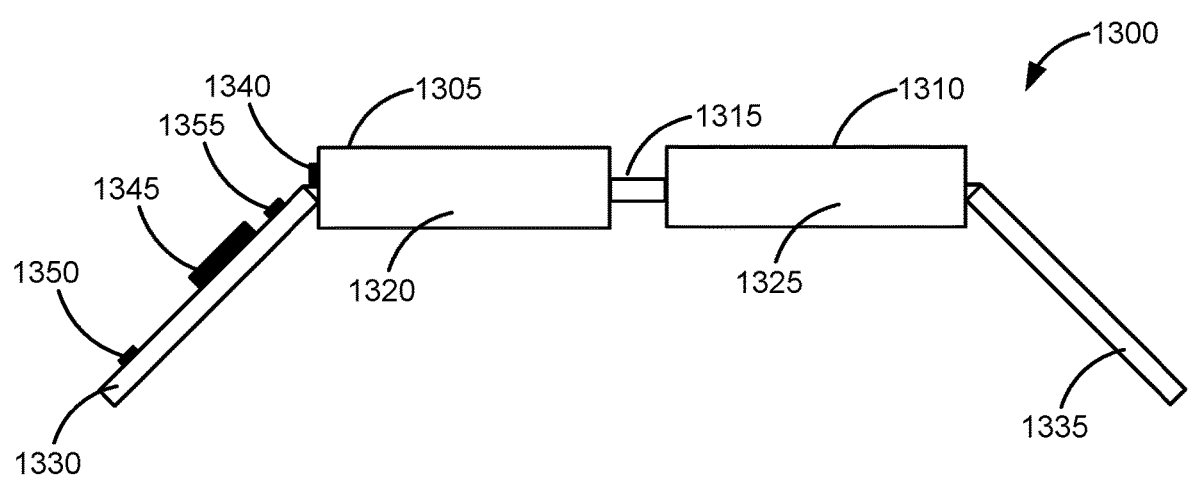
FIG. 13 illustrates an example pair of wearable glasses that may be used with the system of FIG. 1.

FIG. 13 illustrates an example pair of wearable glasses 1300 that may be used with the system of FIG. 1. Wearable glasses 1300 may include lens frame 1305, lens frame 1310, center frame support 1315, lens element 1320, lens element 1325, extending side-arm 1330, extending side-arm 1335, image capture device 1340 (e.g., a camera), on-board computing system 1345 (which may include, or utilize, a touch input feature, such as a touchpad), speaker 1350, and microphone 1355.

Each of the frame elements 1305, 1310, and 1315 and the extending side-arms 1330, 1335 can be formed of a solid structure of plastic and/or metal, or can be formed of a hollow structure of similar material so as to allow wiring and component interconnects to be internally routed through the wearable glasses 1300. Other materials can be possible as well. At least one of the lens elements 1320, 1325 can be formed of any material that can suitably display a projected image or graphic. Each of the lens elements 1320, 1325 can also be sufficiently transparent to allow a user to see through the lens element. Combining these two features of the lens elements can facilitate an augmented reality or heads-up display where the projected image or graphic is superimposed over a real-world view as perceived by the user through the lens elements.

The center frame support 1315 and the extending side-arms 1330, 1335 are configured to secure the wearable glasses 1300 to a user's face via a user's nose and ears, respectively. The extending side-arms 1330, 1335 can each be projections that extend away from the lens-frames 1305, 1310, respectively, and can be positioned behind a user's ears to secure the wearable glasses 1300 to the user. The extending side-arms 1330, 1335 can further secure the wearable glasses 1300 to the user by extending around a rear portion of the user's head. Additionally, or alternatively, for example, the wearable glasses 1300 can connect to or be affixed within a head-mounted helmet structure. Other configurations for wearable glasses are also possible.

The on-board computing system 1345 is shown to be positioned on the extending side-arm 1330 of the wearable glasses 1300; however, the on-board computing system 1345 can be provided on other parts of the wearable glasses 1300 or can be remotely positioned from the wearable glasses 1300 (e.g., the on-board computing system 1345 could be wire- or wirelessly-connected to the wearable glasses 1300). The on-board computing system 1345 can include a processor and memory, for example. The on-board computing system 1345 can be configured to receive and analyze data from the image capture device 1340 (and possibly from other sensory devices) and generate images for output by the lens elements 1320, 1325.

The image capture device 1340 can be, for example, a camera that is configured to capture still images and/or to capture video. In the illustrated configuration, image capture device 1340 is positioned on the extending side-arm 1330 of the wearable glasses 1300; however, the image capture device 1340 can be provided on other parts of the wearable glasses 1300. The image capture device 1340 can be configured to capture images at various resolutions or at different frame rates. Many image capture devices with a small form-factor, such as the cameras used in mobile phones or webcams, for example, can be incorporated into an example of the wearable glasses 1300.

One image capture device 1340 is illustrated. However, more image capture devices can be used, and each can be configured to capture the same view, or to capture different views. For example, the image capture device 1340 can be forward facing to capture at least a portion of the real-world view perceived by the user. This forward-facing image captured by the image capture device 1340 can then be used to generate an augmented reality where computer generated images appear to interact with or overlay the real-world view perceived by the user.

Wearable glasses 1300 can be used to (e.g., the on-board computing system 1345) interpret certain gestures (e.g., by a wearer's hand or hands) as user input. For example, wearable glasses 1300 can capture hand gestures by analyzing image data from image capture device 1340, and initiate tasks that are defined as corresponding to certain gestures. Further, speaker 1350 and microphone 1355 can be used as input/output components. For example, the microphone 1355 can detect speech that can be used to supplement and/or modify the intent associated with the hand gesture. The speaker can be configured to output an audible signal that can be heard by the user. The audible signal can be associated with the task associated with the task(s) that are responsive to the hand gesture. For example, the audible signal can be a beep indicating a task has been completed.

In some implementations, the wearable glasses 1300 can determine a user's intent, such as an intent to perform a touch to read operation, as described herein. In some implementations, it should be noted that the wearable glasses 1300 may determine user's intent based on a combination of hand gestures and verbal commands from a digital assistant.

Figure 14:
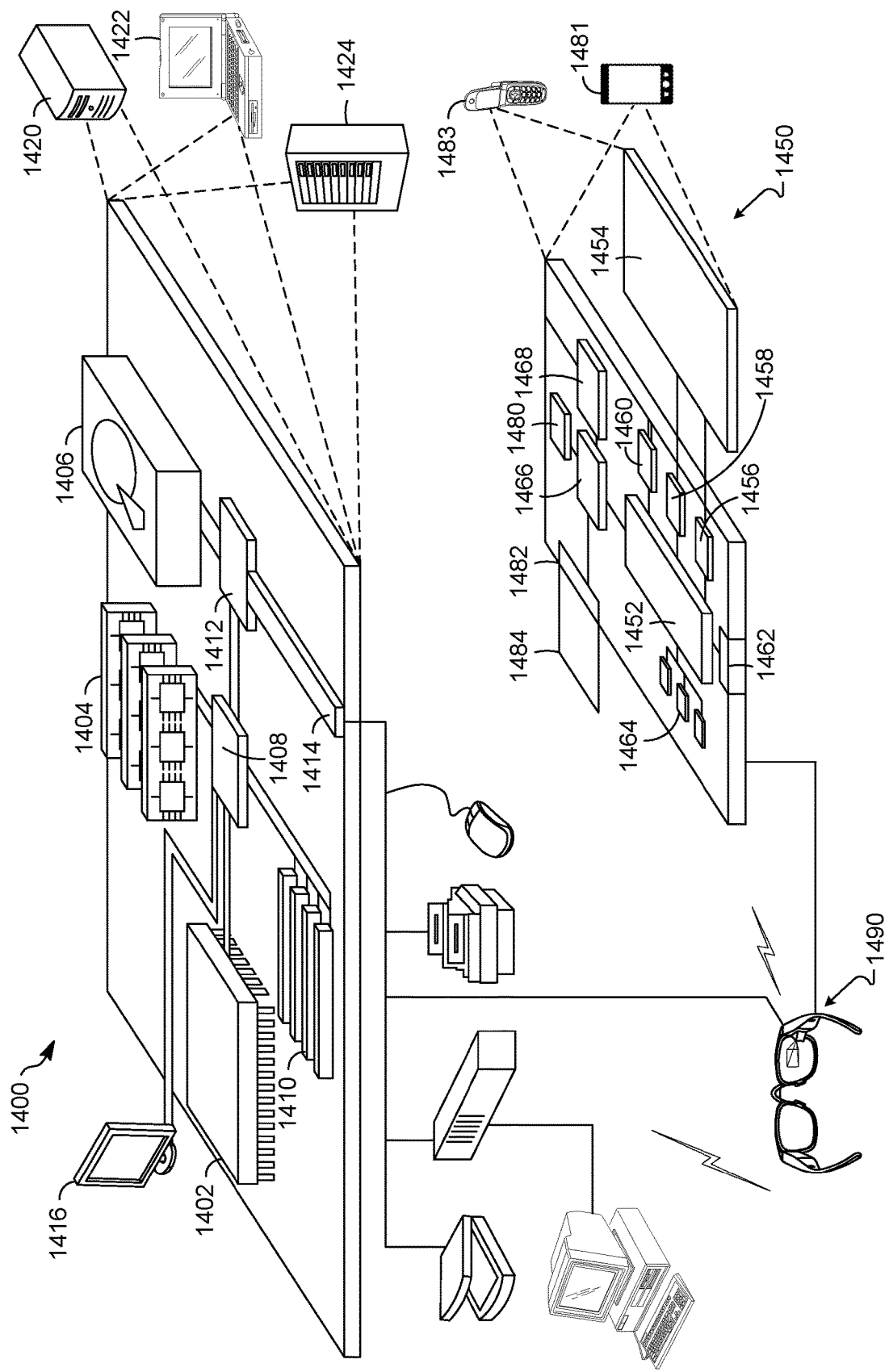
FIG. 14 shows an example of a computer device, mobile computer device and head mounted device according to at least one example implementation.

FIG. 14 shows an example of a computer device 1400 and a mobile computer device 1450, which may be used with the techniques described here. Computing device 1400 is intended to represent various forms of digital computers, such as laptops, desktops, tablets, workstations, personal digital assistants, smart devices, appliances, electronic sensor-based devices, televisions, servers, blade servers, mainframes, and other appropriate computing devices. Computing device 1450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. The processor 1402 can be a semiconductor-based processor. The memory 1404 can be a semiconductor-based memory. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk. In general, the computer-readable medium may be a non-transitory computer-readable medium.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods and/or computer-implemented methods, such as those described above. The information carrier is a computer- or machine-readable medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1484 may also be provided and connected to device 1450 through expansion interface 1482, which may include, for example, a SIMM (Single In Line Memory Module) card interface. Such expansion memory 1484 may provide extra storage space for device 1450, or may also store applications or other information for device 1450. Specifically, expansion memory 1484 may include instructions to carry out or supplement the processes described above, and may include secure information also. Thus, for example, expansion memory 1484 may be provided as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1484, or memory on processor 1452, that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, low power Bluetooth, Wi-Fi, or other such transceiver (not shown). In addition, GPS (Global Positioning System) receiver module 1480 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1483. It may also be implemented as part of a smart phone 1481, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 14 can include sensors that interface with, or are included in, a HMD 1490. For example, one or more sensors included on computing device 1450 or other computing device depicted in FIG. 14, can provide input to HMD 1490 or in general, provide input to that can be used by the HMD 1490. The sensors can include, but are not limited to, a touchscreen, accelerometers, gyroscopes, pressure sensors, biometric sensors, temperature sensors, humidity sensors, and ambient light sensors. Computing device 1450 (e.g., the HMD 1490) can use the sensors to determine an absolute position and/or a detected rotation of the HMD 1490 that can then be used as input for use by the HMD 1490.

In some implementations, one or more input devices included on, or connected to, the computing device 1450 and/or the HMD 1490 can be used as inputs for use by the HMD 1490. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device.

In some implementations, one or more output devices included on the computing device 1450, and/or in the HMD 1490, can provide output and/or feedback to a user of the HMD 1490. The output and feedback can be visual, tactical, or audio. The output and/or feedback can include, but is not limited to, rendering a display of the HMD 1490, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, computing device 1450 can be placed within HMD 1490 to create an integrated HMD system. HMD 1490 can include one or more positioning elements that allow for the placement of computing device 1450, such as smart phone 1481, in the appropriate position within HMD 1490. In such implementations, the display of smart phone 1481 can render images using a display of the HMD 1490.

In some implementations, the computing device 1450 may appear as another object in a computer-generated, 3D environment. Interactions by the user with the computing device 1450 (e.g., rotating, shaking, touching a touchscreen, swiping a finger across a touch screen) can be interpreted as interactions with the object in the AR/VR space. As just one example, computing device can be a laser pointer. In such an example, computing device 1450 appears as a virtual laser pointer in the computer-generated, 3D environment. As the user manipulates computing device 1450, the user in the AR/VR space sees movement of the laser pointer. The user receives feedback from interactions with the computing device 1450 in the AR/VR environment on the computing device 1450 or on the HMD 1490.

In some implementations, a computing device 1450 may include a touchscreen. For example, a user can interact with the touchscreen in a particular manner that can mimic what happens on the touchscreen with what happens in a display of the HMD 1490. For example, a user may use a pinching-type motion to zoom content displayed on the touchscreen. This pinching-type motion on the touchscreen can cause information provided in display to be zoomed. In another example, the computing device may be rendered as a virtual book in a computer-generated, 3D environment.

In some implementations, one or more input devices in addition to the computing device (e.g., a mouse, a keyboard) can be rendered in a display of the HMD 1490. The rendered input devices (e.g., the rendered mouse, the rendered keyboard) can be used as rendered in the in the display.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example implementations. Example implementations, however, may be embodied in many alternate forms and should not be construed as limited to only the implementations set forth herein.

The terminology used herein is for the purpose of describing particular implementations only and is not intended to be limiting of the implementations. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 130 degrees or at other orientations) and the spatially relative descriptors used herein may be interpreted accordingly.

Example implementations of the concepts are described herein with reference to cross-sectional illustrations that are schematic illustrations of idealized implementations (and intermediate structures) of example implementations. As such, variations from the shapes of the illustrations as a result, for example, of manufacturing techniques and/or tolerances, are to be expected. Thus, example implementations of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example implementations.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present implementations.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A non-transitory computer-readable storage medium having instructions stored thereon, the instructions when executed by at least one processor of at least one computing device, are configured to cause the at least one computing device to:

receive, at a head-mounted device (HMD), a selection of a mode of operation of a content reader of the HMD from a plurality of modes of operation;

initiate, in response to the selection, a content capture process to capture content within a field of view (FOV) of a camera of the HMD, the content capture process including a framing process, the framing process including:

identifying at least one boundary of the content to be captured; and providing, based on the at least one boundary, at least one directional instruction for orienting the content to be captured within the FOV of the camera;

identify, in the captured content, a plurality of content items;

receive, at the HMD, a navigation command to select a content item from the plurality of content items; and provide, in response to the navigation command, the selected content item.

2. The non-transitory computer-readable storage medium of claim 1, wherein the selection of the mode of operation includes one of:
a menu selection; or
a spoken command.

3. The non-transitory computer-readable storage medium of claim 1, wherein the plurality of modes of operation includes:
a hold-to-read mode of operation;
a touch-to-read mode of operation; and
a look-to-read mode of operation.

4. The non-transitory computer-readable storage medium of claim 3, wherein, in response to selection of the touch-to-read mode of operation, initiating a pointer tracking process that tracks a pointer that is visible together with the content with the FOV of the camera, the navigation command including selecting the content item from the plurality of content items based on the pointer tracking process.

5. The non-transitory computer-readable storage medium of claim 3, wherein, in response to selection of the hold-to-read mode of operation, initiation of the content capture process includes detection of the content within the FOV of the camera for a threshold period of time.

6. The non-transitory computer-readable storage medium of claim 3, wherein, in response to selection of the look-to-read mode of operation, the content capture process includes capturing text content within the FOV of the camera.

7. The non-transitory computer-readable storage medium of claim 1, wherein the content includes text, and the plurality of content items include respective portions of the text.

8. The non-transitory computer-readable storage medium of claim 1, wherein identifying the at least one boundary includes:
identifying vertices of the content to be captured using a coordinate mapping process.

9. The non-transitory computer-readable storage medium of claim 1, wherein the instructions, when executed, are further configured to cause the at least one computing device to:
identify the plurality of content items using a content item recognition technique.

10. The non-transitory computer-readable storage medium of claim 9, wherein identifying the plurality of content items using the content item recognition technique includes identifying the content as one of:
a consumer product; or
a document.

11. The non-transitory computer-readable storage medium of claim 1, wherein the instructions, when executed, are further configured to cause the at least one computing device to:
execute a content translation process including translating the selected content item from a first language to a second language.

12. The non-transitory computer-readable storage medium of claim 1, wherein the instructions, when executed, are further configured to cause the at least one computing device to:
provide a summary of the content based on identification of at least one content item of the plurality of content items.

13. The non-transitory computer-readable storage medium of claim 1, wherein identifying the plurality of content items includes:
identifying at least one content sub-item within a content item of the plurality of content items.

14. A computer-implemented method, the method comprising:
receiving, at a head-mounted device (HMD), a selection of a mode of operation of a content reader of the HMD from a plurality of modes of operation;

initiating, in response to the selection, a content capture process to capture content within a field of view (FOV) of a camera of the HMD, the content capture process including a framing process, the framing process including:

identifying at least one boundary of the content to be captured; and providing, based on the at least one boundary, at least one directional instruction for orienting the content within the FOV of the camera;

identifying, in the captured content, a plurality of content items;

receiving, at the HMD, a navigation command to select a content item from the plurality of content items; and providing, in response to the navigation command, the selected content item.

15. The computer-implemented method of claim 14, wherein the plurality of modes of operation includes:
a hold-to-read mode of operation;
a touch-to-read mode of operation; and
a look-to-read mode of operation.

16. The computer-implemented method of claim 15, further comprising:
in response to selection of the touch-to-read mode of operation, initiating a pointer tracking process that tracks a pointer that is visible together with the content with the FOV of the camera, the navigation command selecting the content item from the plurality of content items being based on the pointer tracking process.

17. The computer-implemented method of claim 15, further comprising:
in response to selection of the look-to-read mode of operation, the content capture process includes capturing text content within the FOV of the camera.

18. A head-mounted device (HMD) comprising:
at least one memory including instructions; and at least one processor that is operably coupled to the at least one memory and that is arranged and configured to execute the instructions to cause the at least one processor to:
 receive a selection of a mode of operation of a content reader of the HMD from a plurality of modes of operation;
 initiate, in response to the selection, a content capture process to capture content within a field of view (FOV) of a camera of the HMD, the content capture process including a framing process, the framing process including:
  identifying at least one boundary of the content to be captured; and
  providing, based on the at least one boundary, at least one directional instruction for orienting the content within the FOV of the camera;
 identify, in the captured content, a plurality of content items;
 receive a navigation command to select a content item from the plurality of content items; and
 provide, in response to the navigation command, the selected content item.

19. The HMD of claim 18, identifying the at least one boundary includes:
 identifying vertices of the content to be captured using a coordinate mapping process.

20. The HMD of claim 18, the HMD being further configured to:
 execute a content translation process including translating the selected content item from a first language to a second language.

\* \* \* \* \*

UNITED STATES PATENT AND TRADEMARK OFFICE
CERTIFICATE OF CORRECTION

PATENT NO. : 11,435,857 B1
APPLICATION NO. : 17/302283
DATED : September 6, 2022
INVENTOR(S) : Wu et al.

It is certified that error appears in the above-identified patent and that said Letters Patent is hereby corrected as shown below:

On the Title Page

Column 2, item (56), under "U.S. PATENT DOCUMENTS", Line 3, delete "Na'Aman" and insert -- Na'aman --, therefor.

In the Claims

In Column 37, Claim 19, Line 24, before "identifying" insert -- wherein --.

Signed and Sealed this
Twelfth Day of September, 2023

Katherine Kelly Vidal
*Director of the United States Patent and Trademark Office*